(12) United States Patent
Izmailov et al.

(10) Patent No.: US 11,604,120 B1
(45) Date of Patent: Mar. 14, 2023

(54) CELL RECOVERY METHOD AND DEVICE

(71) Applicant: ANGLE EUROPE LIMITED, Guildford (GB)

(72) Inventors: Alexandre Izmailov, Etobicoke (CA); Brian Pak, Richmond Hill (CA); Tomoyuki Sen, Toronto (CA); Paul Timothy Smith, Acton (CA)

(73) Assignee: ANGLE EUROPE LIMITED, Guildford (GB)

( * ) Notice: Subject to any disclaimer, the term of this patent is extended or adjusted under 35 U.S.C. 154(b) by 0 days.

(21) Appl. No.: 17/868,988

(22) Filed: Jul. 20, 2022

Related U.S. Application Data

(62) Division of application No. 17/840,373, filed on Jun. 14, 2022, now Pat. No. 11,435,267.

(51) Int. Cl.
*G01N 1/30* (2006.01)
*B01L 3/00* (2006.01)

(52) U.S. Cl.
CPC .......... *G01N 1/30* (2013.01); *B01L 3/502753* (2013.01); *B01L 3/502761* (2013.01); *B01L 2200/0647* (2013.01); *B01L 2300/0822* (2013.01); *B01L 2300/0832* (2013.01); *B01L 2400/088* (2013.01)

(58) Field of Classification Search
CPC ..... B01L 2200/0647; B01L 2300/0822; B01L 2300/0832; B01L 2400/088; B01L 3/502753; B01L 3/502761; G01N 1/30
See application file for complete search history.

(56) References Cited

U.S. PATENT DOCUMENTS

| | | | |
|---|---|---|---|
| 5,480,484 A * | 1/1996 | Kelley | G01N 1/2813 494/20 |
| 2008/0214378 A1 | 9/2008 | Stokes | |
| 2021/0244019 A1 * | 8/2021 | Schyver | B65D 1/0223 |

* cited by examiner

*Primary Examiner* — Jennifer Wecker
(74) *Attorney, Agent, or Firm* — Hill & Schumacher

(57) ABSTRACT

The present disclosure provides a cell harvesting method for the efficient sedimentation and retention of cells from liquid samples onto a solid support with low cell losses and low impact on cell morphology.

7 Claims, 35 Drawing Sheets

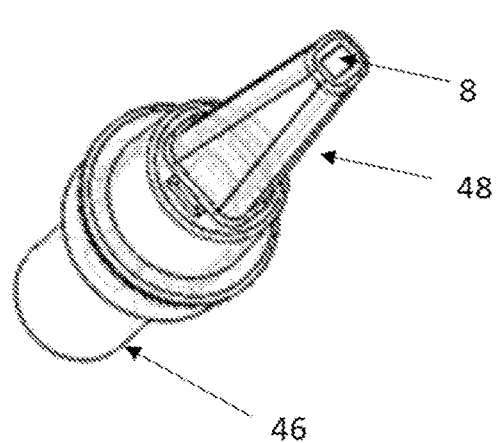 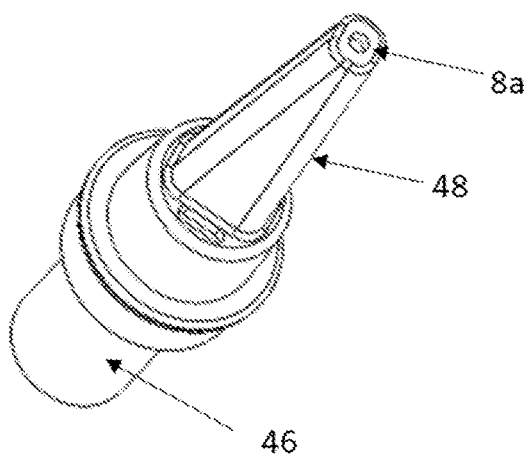
FIG. 5(a)　　　　　　FIG. 5(b)
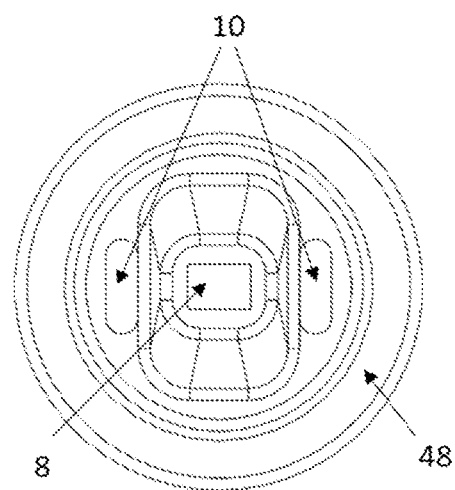 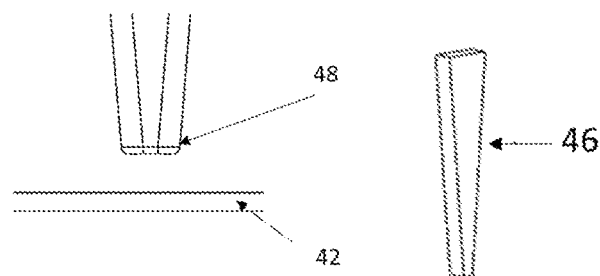
FIG. 6(a)　　　FIG. 6(b)　　　FIG. 6(c)

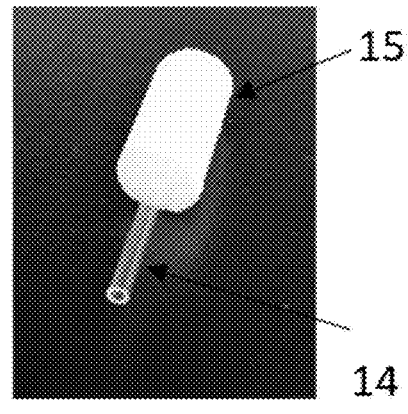
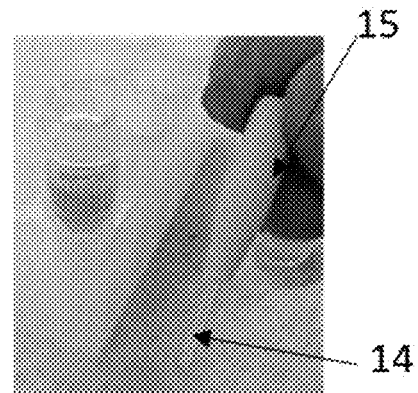
FIG. 6(d)　　　　　FIG. 6(e)
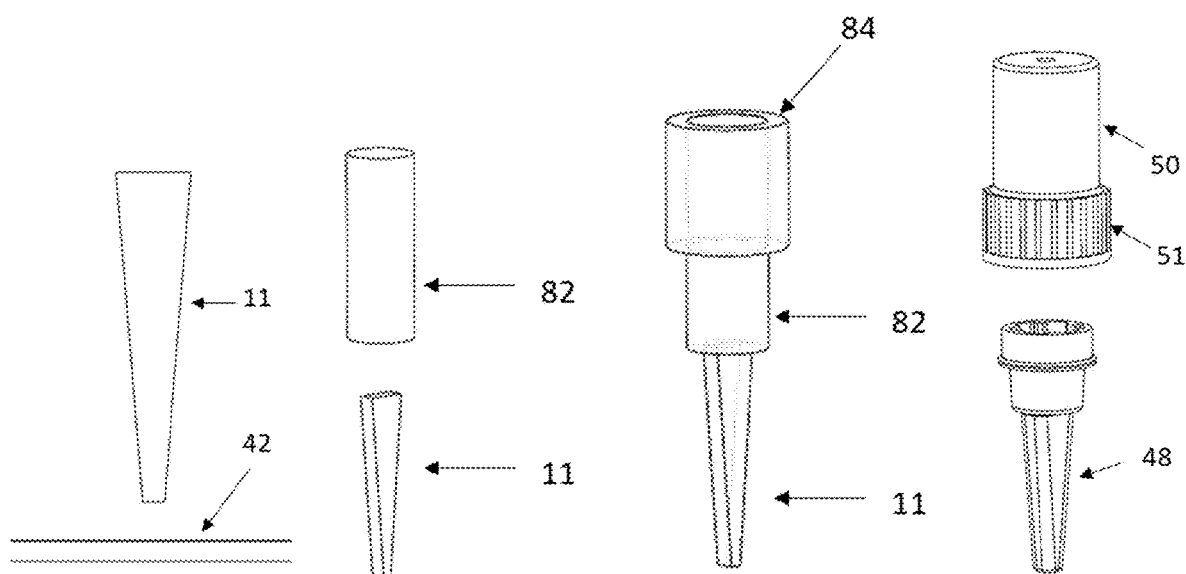
FIG. 7(a)　　FIG. 7(b)　　FIG. 7(c)　　FIG. 7(d)

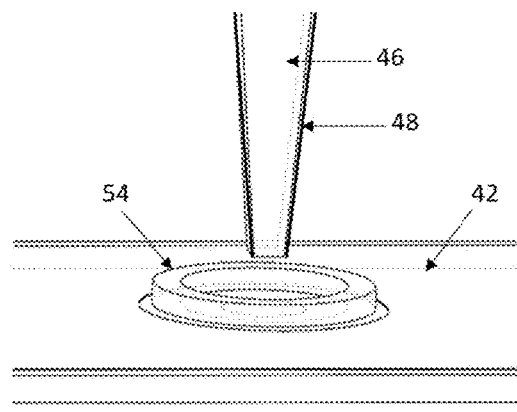
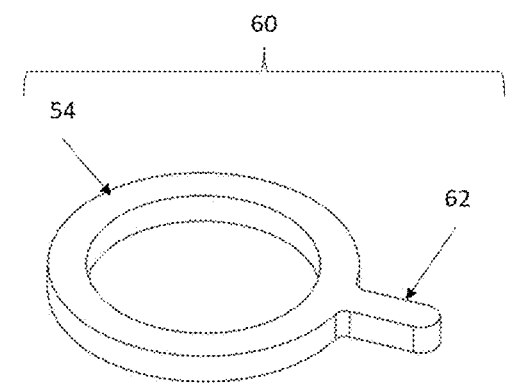
FIG. 8(a)   FIG. 8(b)
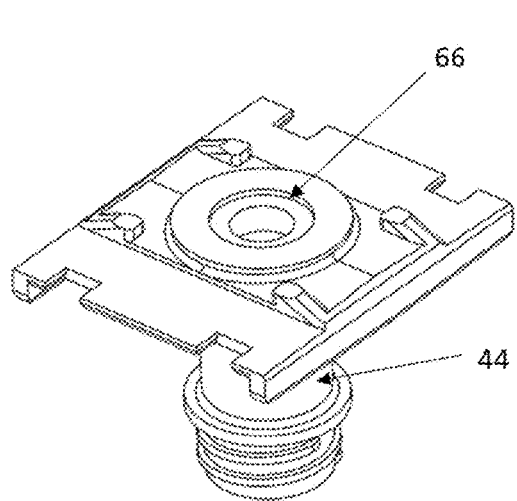
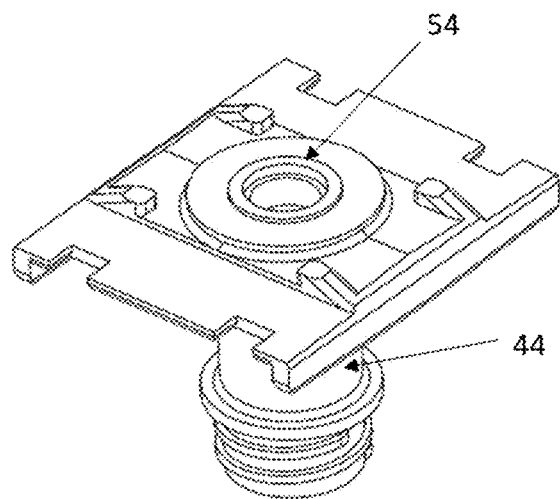
FIG. 8(c)   FIG. 8(d)

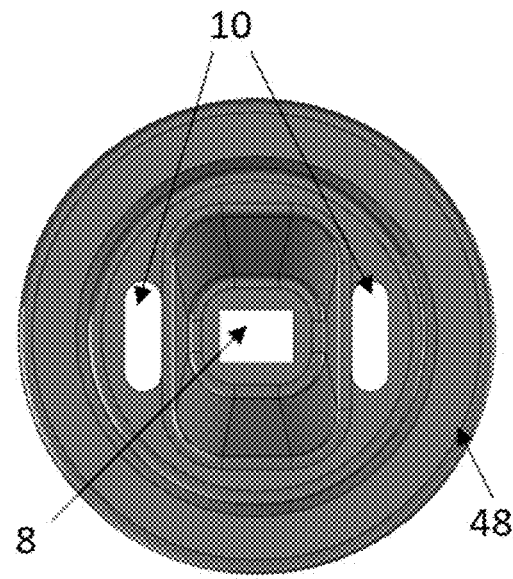
FIG. 9
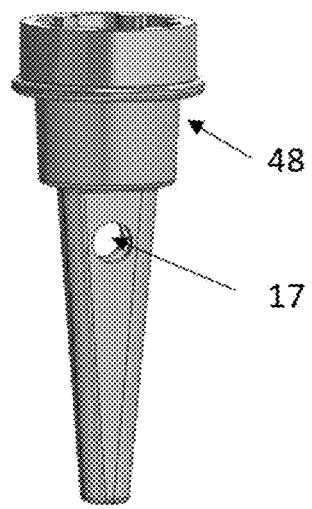 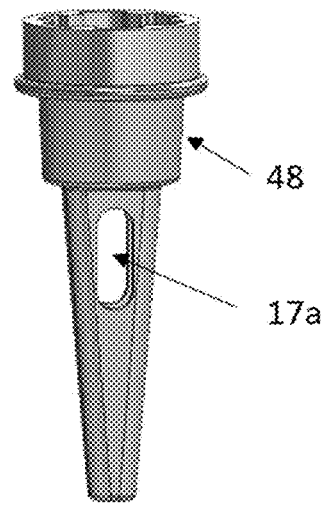
FIG. 10(a)　　　　　　　　FIG. 10(b)

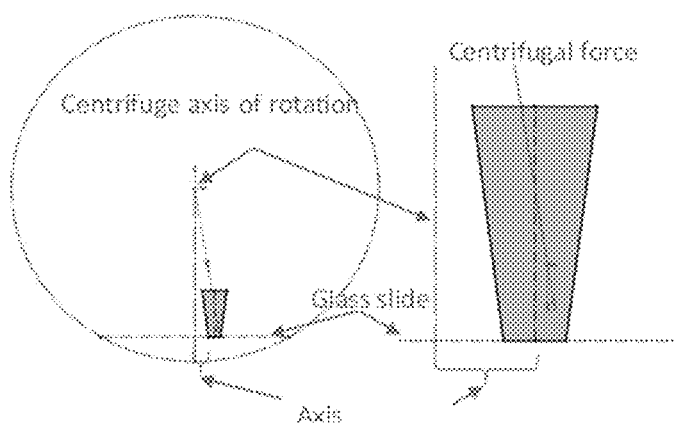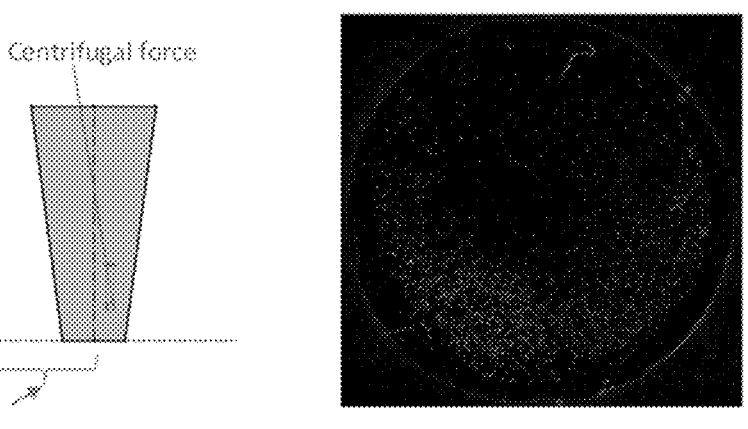
FIG. 18(a)    FIG. 18(b)    FIG. 18(c)

CELL RECOVERY METHOD AND DEVICE

FIELD

The present disclosure relates to a cell recovery method and device for the efficient sedimentation and retention of cells from liquid samples onto a solid support with low cell loss and low impact on cell morphology.

BACKGROUND

There are many methods/devices used to isolate cells from liquid samples. Many involve the use of cytocentrifugation which accelerates cell sedimentation towards a desired collection point. Drawbacks to many of these methods/devices include significant cell loss and altered cell morphology which may be detrimental for subsequent analysis.

In clinical applications, a variety of different fluid specimens are routinely analyzed for the presence and characterization of cells. These include blood, urine, cerebrospinal fluid, synovial fluid and ascites. In blood, a population of so-called "circulating rare cells" have been identified in some patients representing cells that have disseminated from their tissue of origin. Amongst the most sought-after type of circulating rare cells are circulating tumour cells (CTC), which, if present, may provide important information on disease status and prognosis.

The efficient recovery of cells in samples containing rare cells is significant as even a moderate cell loss during sample processing may result in incorrect enumeration or a false negative result where a sample containing rare cells may be erroneously designated as having none. Many technologies have recently emerged which enrich circulating rare cells from blood.

Various methods are used for extracting rare cells from patient samples (cell recovery) resulting typically in a fluid sample containing cells of interest in combination with other cells (e.g., white blood cells). Harvested cells are important for researchers and in most of the cases microscopic study and consecutive molecular analysis of these cells is conducted. In order to make this analysis possible the cells present in the sample should be sedimented (deposited) onto a surface of a solid support allowing microscopy of these cells. Typically, the harvested cells are sedimented onto microscopy slides, which can be glass or plastic slides. One of the fundamental requirements for this process is to prevent cell losses. This becomes especially important when the user is working with rare cells: in this case the sample may contain very few of such cells and loss of even small number of cells may make the consecutive analysis unreliable or impossible. The second major requirement is that the process of cell retention should cause minimal morphological change of the cells to aid in cytological analysis.

For example, U.S. Pat. No. 7,575,719 discloses a fluid sample chamber that can be sealed onto a microscope slide surface. This means of sealing can be used in conjunction with a filter card placed or ultrasonic welded between the microscope surface and sample chamber. This method of fluid removal poses the risk of unintentional loss of sample to the surrounding absorbent filter card medium.

U.S. Pat. No. 7,628,955 discloses a chamber for fluid samples that can be sealed onto the surface of a microscope slide through the use of integrally molded elastomeric gaskets and oil film components. This device does not provide a means of removing liquid in a controlled manner to prevent the removal of sedimented cells from the slide.

U.S. Pat. No. 4,696,743 discloses a filter card placed between a sample chamber and deposit-receiving surface such as a microscope slide. Solids present within the fluid suspension are centrifuged to the slide surface while the surrounding fluids are drawn into the adjacent absorbent medium. This device does not address the issue of cell loss by means of separating the fluid removal step from the centrifugation/sedimentation step.

U.S. Patent Publication No. 2003/0175850 discloses a method of enriching cells of interest from a suspension by utilizing biotin conjugated antibodies to selectively label cells then bind them to a slide surface coated with an avidin/streptavidin substrate. An absorptive medium wicks off any unbound materials or fluids to leave a dried slide containing samples of interest. This device does not account for the turbulence and sheer stresses resulting from the lateral flow of liquid into the medium at an uncontrolled rate. While this grants the ability to remove unbound cells in suspension, it also leaves the risk of fortuitously removing slide-bound target cells.

U.S. Pat. No. 5,419,279 discloses a flanged hollow tube for sample deposition that engages with a corresponding base to securely seal the tube onto a microscope slide for staining purposes. The bottom of the tube features a groove such that an O-ring may be fitted between interface of the slide and tube to prevent leakage. This apparatus is reliant upon the binding forces between a functionalized slide surface and cell rather than centrifugal forces in addition to functionalization to encourage the capture of target cells and further does not address the removal of supernatant throughout the cell sedimentation/binding steps which may present avenues for cell loss due to the disturbance of surrounding liquid medium.

U.S. Pat. No. 5,480,484 discloses a fluidic chamber sealed centrally (relative to the microscope slide) via an elastomeric gasket and metal clips onto a supportive backing plate. The number of fluidic chambers can be changed to accommodate one or multiple samples albeit with a change in allowable maximum sample volume. The assembled centrifugation device free floats within the specified rotor and deposits cells from suspension onto the slide surface upon the application of centrifugal force. This device does not account for a convenient and controlled method of supernatant removal. Rather, the chamber has a relatively narrow opening which does not lend itself to the removal of fluid.

U.S. Pat. No. 4,576,110 discloses a rotor chamber designed to deposit a cell suspension onto a microscope slide under the application of centrifugal force. Concurrently, an absorptive plug (shown in FIG. 9 of the patent) is placed into a separate compartment within the rotor that protrudes into the same chamber such that the tip of the plug is touching the slide surface. As centrifugal force is applied to the rotor, particles suspended in the liquid are deposited onto the slide surface. According to this patent as the centrifugal force is high enough to overcome the capillary force, the absorbent plug does not draw up the supernatant until after the rotor slows. On the other hand, the absorbing element 3 is introduced into the system prior to centrifugation and absorption starts immediately and lasts until centrifugation forces exceed capillary forces. This potentially leads to loss of the cells present in the solution. While the concept of separating the processes of cell sedimentation and supernatant removal into mutually exclusive steps is similar to our device, there are key differences in the approach to fluid absorption that distinguish the two designs. One of the main features of the prior art is that the absorbent plug protrudes into the same chamber that the particlecontaining fluid is deposited into. While capillary action may not act upon the fluid during centrifugation, there is still a possibility of losing cells within the absorbent plug by mere physical entanglement of the cells within the porous material thus leading to cell loss. In addition, the absorbent plug is noted as being in physical contact with the deposition surface when placed within the rotor. The close proximity and lack of control in flow rate of fluid into the absorbent material can result in the unintended absorption of cells that are weakly adhered to the deposition surface.

U.S. Pat. No. 4,344,562 discloses a device utilizing a conventional glass slide which can be locked into a housing by means of a holder. Part of the housing is a reservoir in which a fluid sample may be received, the reservoir being closed off at its bottom by the glass slide when the glass slide has been locked into the housing. The patent is aimed to centrifugation of small fluid samples to take place without any loss of cells, enhancing accuracy for purposes of medical diagnosis and treatment. A rubber O-ring is used to provide a fluid tight seal between the components.

SUMMARY

The present disclosure provides a cell recovery device for sedimentation and retention of targeted cells from a fluid sample. The device includes a base configured to releasably hold a solid support with the solid support configured to receive cells on a top surface of the solid support. The device includes a fluid chamber having a first opening with a circumferential gasket surrounding the bottom opening with the base configured to releasably hold the fluid chamber with the gasket bearing against a top surface of the solid support to form a liquid tight seal between the top surface and the solid support, the fluid chamber having a second opening for receiving a liquid sample containing the targeted cells being harvested. The gasket defines an area of selected size into which the targeted cells deposit onto the top surface of the solid support. The device includes a first removable cap configured to close the second opening during centrifugation. The device also includes a fluid absorbing element and a housing configured to receive the absorbing element and the fluid chamber is configured to receive the housing post centrifugation. The housing has a bottom opening through which the fluid from the fluid chamber can be absorbed by the absorbing element when it is introduced into the fluid chamber post centrifugation. The fluid chamber includes a second removable cap configured to close the second opening and to prevent positioning a bottom tip of the absorbing element to a distance from the solid support shorter than a predefined distance. The cell harvesting device is configured to be received and releasably held in a centrifuge.

The fluid absorbing element may have a cross-sectional area, a distribution along an axis of the absorbing element and a porosity in a range to provide control of a rate of absorption of the fluid and the tip of the fluid absorbing element located at the distance from the surface of the solid support such that the targeted cells settled on the solid support are not detached from the surface of the solid support by the flow of the fluid being absorbed by the absorbing element.

The device absorbing element may have a porosity in a range from about 1 about 100 microns, alternatively, the porosity may be in a range from about 5 to about 50 microns, or alternatively the porosity may be in a range from about 10 to about 20 microns. The predefined distance of the tip of the absorbing element above the surface of solid substrate is in a range from about 0.1 mm to about 3 mm.

The device is configured to be releasably held in the centrifuge so that an axis normal to the surface of the solid support and preferably coming through the center of the area allocated for cell sedimentation intersects the axis of rotation and the long axis of the solid support is in the plane of rotation; or the normal to the surface of the solid support intersects the axis of rotation and the long axis of the solid support is perpendicular to the plane of rotation.

The area of selected size into which the targeted cells deposit onto the top surface of the solid support may be functionalized with agents selected to modify the interaction between the targeted cells and the surface to assist adherence of the targeted cells to the top surface of the solid support. These agents may be selected from the group consisting of poly-L-lysine, silane coatings, gelatin, fibronectin, gold or silver coatings. For example, glass slides coated with poly-L-lysine (Merck, USA) can be used.

These agents are selected to provide a differential binding force to the targeted cells and any other interfering cells such that the targeted cells are bound to the surface while any interfering cells do not bind the surface of the top surface of the solid support.

The device absorbing element may be made of porous plastic, and the porous plastic may be coated with a hydrophilic coating. The device absorbing element may be made of non-porous absorbing materials such as paper tissue, cotton or other fibers absorbing fluids.

The porous plastic may be porous polyethylene coated with a hydrophilic coating.

The tip of the absorbing material spaced from the top surface of the solid support is placed at the distance from the surface of the solid substrate in the range of about 0.3 mm to about 3 mm.

The porosity of the fluid absorbing element and a size of the opening are selected to provide a selected flow rate.

The selected flow rate provides a fluid force applied to the target cells deposited on the surface which is below a detachment threshold level of the target cells detaching from the surface of the solid support.

The solid support may be a microscope slide.

The first removable cap may include a gasket to provide a liquid tight seal during centrifugation.

The area on the surface of the solid support outside of the area of selected size into which the targeted cells deposit onto the top surface of the solid support may be coated with a protective coating to prevent adhesion of accidentally spilled fluids to the surface of the support.

The housing configured to receive the fluid absorbing element includes overflow features to prevent overflow of fluid caused by insertion of the fluid absorbing element into the fluid chamber. These overflow features may include at least one opening in an upper part of the absorbing element housing and the openings may have any of square, circular or slot shapes.

The present disclosure provides a method for retention on a solid support and postprocessing of target cells present in a fluid medium with optimum retention rate for the target cells adhering to at least a portion of the surface of the solid support and preserved morphology of the target cells. The method includes subjecting the fluid medium to centrifugation to induce sedimentation of the target cells onto the surface of the solid support. Post sedimentation removal of the fluid medium is undertaken and is characterized by a controlled rate of the fluid medium removal such that the target cells sedimented on the surface are not detached from the surface by fluid flow in a vicinity of the sedimented cells. The volume of residual fluid is controlled at all stages of cell retention and post processing. The sedimented target cells are characterized in that the morphology of the target cells is substantially unchanged from their morphology when free floating in the fluid medium.

The flow rate is controlled by the porosity of the material the absorbing element is made of, the area of the opening in the enclosure of the absorbing element and cross-section of the absorbing element.

At least a portion of the surface of the solid support onto which the target cells sediment is of a selected size which is defined by the size of an opening in the fluid chamber in which the fluid containing target cells is placed for centrifugation. The area of selected size may be functionalized with agents selected to modify the interaction between the target cells and the surface to assist adherence of the targeted cells to the top surface of the solid support.

These agents may be selected from the group consisting of poly-L-lysine, silane coatings, gelatin, fibronectin, gold or silver coatings. These agents are selected to provide a differential binding force to the targeted cells and other cells such that the targeted cells are more readily bound to the surface while binding of other cells to the top surface of the solid support is less efficient.

The parameters of the absorbing element and the absorbing element housing are selected so that the shear force associated with the fluid removal rate is low enough so that the detachment of the target cells is minimal but the same shear force is sufficient for removal of other cells that are not of interest, thereby leading to enrichment of the target cells of interest.

A further understanding of the functional and advantageous aspects of the present disclosure can be realized by reference to the following detailed description and drawings.

BRIEF DESCRIPTION OF THE DRAWINGS

Embodiments of the cell harvest device disclosed herein will now be described, by way of example only, with reference to the drawings, in which:

FIG. 5(a) is a perspective view showing the tip of the plastic enclosure 48 of the absorbing element 46 with rectangular opening 8.

FIG. 5(b) is a perspective view showing the tip of the plastic enclosure 48 of the absorbing element 46 with a circular cross-section opening 8a.

FIGS. 6(a) to 6(e) show various implementations of controlling the wicking rate during the process of fluid removal after completion of cell sedimentation according to the proposed method, in which:

FIG. 6(a) shows controlling of fluid removal rate by selection of the cross-sectional area of the opening 8 in the plastic enclosure 48;

FIG. 6(b) shows how this result is achieved by selection of the distance between the plastic enclosure 48 containing and absorbing element 46 (not shown in FIG. 6); the result mentioned above can also be achieved by a combination of cross-sectional area and the distance mentioned above;

FIG. 6(c) shows control of the fluid flow rate by selection of the geometry of the absorbing element 46;

FIG. 6(d) shows control of the fluid flow rate by an additional capillary tube 14 attached to the porous material 15 and selection of capillary length and inner diameter; and FIG. 6(e) shows a capillary 14 with continuously increasing cross-sectional area filled with porous material.

FIGS. 7(a) to 7(e) show progressively more components forming absorbing element which is a part of the present device including a flat tip 11, cylindrical rod 82 and hollow cylindrical rod 84 allowing increase of the wicking capacity of the absorbing element, wherein:

FIG. 7(a) shows a tip of the absorbing element 46 made as a flat porous component 11 which is placed in proximity to the solid support 42;

FIG. 7(b) shows an exploded view of the absorbing element 46 composed of two porous components 11 and 82;

FIG. 7(c) shows an assembled multicomponent absorbing element 46 composed of three parts: flat porous component 11, cylindrical porous part 82 and hollow cylindrical porous part 84;

FIG. 7(d) shows the plastic enclosure for the absorbing element 46 (not shown in this drawing) containing a wicking cavity 48 and a cap 50 with riffled surface 51; and FIG. 7(e) shows an exploded view of the encapsulated multicomponent absorbing element 90.

FIG. 8(a) shows the tip of the absorbing element 46 in the enclosure 48 and a sealing gasket 54 attached to the surface of the substrate 42 which creates a cavity for the reagents.

FIG. 8(b) shows another embodiment of a gasket 60 in which a protruding element 62 is added to gasket 54.

FIGS. 8(c) to 8(f) are perspective views showing the bottom of fluid chamber 44 and two embodiments of groves in the bottom of fluid chamber 44 for accepting sealing gaskets, one embodiment shown in FIGS. 8(c) and 8(d) and the other embodiment shown in FIGS. 8(e) and 8(f).

FIG. 9 shows is a view of the absorbing element housing 48 showing overflow protection features 10.

FIG. 10(a) shows a first embodiment of the absorbent material housing 48 having flow accelerating features 17 for increase of the wicking rate without impact onto cell loss, which are circular holes.

FIG. 10(b) shows a second embodiment of the absorbent material housing 48 having flow accelerating features 17a, which are elongated slots.

FIGS. 18(a) to 18(f) shows a series of panels showing the importance of proper alignment of the cell retention device axis relative to the axis of rotation in a centrifuge in which:

FIG. 18(a) shows a schematic representation of the fluid chamber 44 with the cells in a centrifuge with the axis of the device shifted from the axis of the centrifuge;

FIG. 18(b) shows force distribution during centrifugation.

FIG. 18(c) shows the resulting inhomogeneous distribution of the sedimented cells;

FIG. 18(d) shows plots of calculated displacement of the cells in the direction perpendicular to the axis of rotation from the original position as a function of the initial distance between the cell and the axis of the deice for different displacement of device axis relative to the axis of rotation in a centrifuge for 10 mm;

FIG. 18(e) shows the same for a displacement of 0.75 mm and panel; and

FIG. 18(f) shows the same for a displacement of 0 mm.

DETAILED DESCRIPTION

Figure 1:
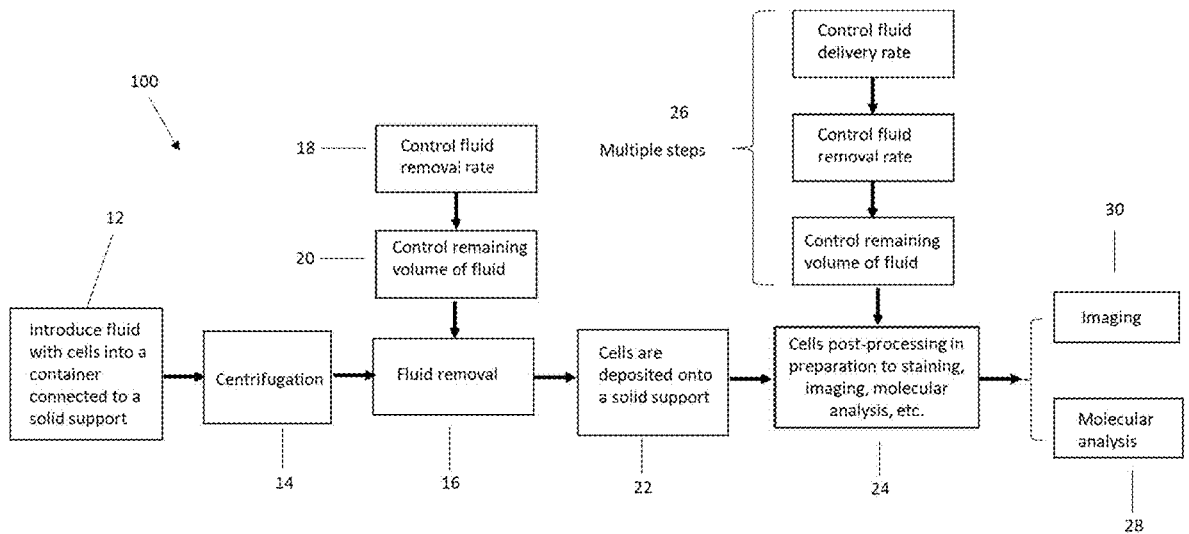
FIG. 1 is a flow diagram of the cell retention method disclosed herein.

Various embodiments and aspects of the disclosure will be described with reference to details discussed below. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

As used herein, the terms, "comprises" and "comprising" are to be construed as being inclusive and open ended, and not exclusive. Specifically, when used in the specification and claims, the terms, "comprises" and "comprising" and variations thereof mean the specified features, steps or components are included. These terms are not to be interpreted to exclude the presence of other features, steps or components.

As used herein, the term "exemplary" means "serving as an example, instance, or illustration," and should not be construed as preferred or advantageous over other configurations disclosed herein.

As used herein, the terms "about" and "approximately" are meant to cover variations that may exist in the upper and lower limits of the ranges of values, such as variations in properties, parameters, and dimensions. In one non-limiting example, the terms "about" and "approximately" mean plus or minus 10 percent or less.

Unless defined otherwise, all technical and scientific terms used herein are intended to have the same meaning as commonly understood to one of ordinary skill in the art.

As used herein, the phrase "target cells" means the cells of interest being isolated by the present device. In some cases, all the cells present in the sample may be of interest if selectivity in cell isolation is not required for that particular intended use or for the following post-processing method and thus all cells present in the sample would be considered "target cells". While other cells may be present so that there is a mixture different types of cells, it is only the "target cells" that are being isolated or predominantly isolated.

As used herein, the phrase "accelerating features" refers to structural elements designed to increase the rate of fluid removal from the fluid chamber 44 after completion of centrifugation without loss of the cells deposited on the surface of solid support 42. This allows for a reduction of the time required for sample processing. These accelerating features are located on the enclosure 48 providing an additional fluidic connection between the fluid present in the fluid chamber 44 and the absorbing element 46. The accelerating features may be of a round shape, or have a shape of a slot. Other shapes are possible as well. The accelerating features are configured so that the open are of the features is sufficient to increase the flow rate to the required value and the accelerating features are located of the enclosure 48 at such a distance from the tip of the enclosure 48 that the additional shear stress applied to the cells on the solid support 42 due to the increased flow rate doe not cause additional cell losses.

As used herein, the phrase "overflow protection features" refers to structural elements designed to prevent overflow of fluid from the fluid chamber 44 when the absorbing element 46 placed in the enclosure 48 is inserted into fluid chamber 44. These overflow protection features are located on the enclosure 48 providing an additional fluidic connection between the fluid present in the fluid chamber 44 in case when the volume of the sample is excessive. These overflow protection features protect against creation of turbulent flow in the fluid chamber 44 which might cause cell detachment from the surface of the solid support 42.

The present disclosure describes a device comprising a fluid chamber assembled with a microscope slide (or other substrate) that has been sealed liquid-tightly using an elastomeric gasket. The slide surface has been functionalized with a coating allowing capturing and retention of cells and is held in a polypropylene holder that clips onto the fluid chamber thus physically securing and positioning the chamber relative to the slide. Apart from the assembly containing the microscope slide, it also features a porous absorbing element that is contained within a polypropylene shell that improves usability while providing a means by which to control the flow rate of liquid into the porous absorbing element. The absorbing element in the polypropylene shell is introduced into the assembly after completion of the centrifugation stage and can be replaced with the identical absorbing element and shell if the process of cell post processing requires multiple steps of fluid introduction and removal.

The device is intended to serve as a cytocentrifugation device where cells of interest that are suspended in a surrounding medium are of a higher density than the surrounding medium, thus when centrifugal force is applied to the device containing the cell suspension, the denser cells of interest are preferentially sedimented according to the direction of the centrifugal force. Cytocentrifugation devices can be largely categorized into two groups based on their method of fluid removal. In a "Simultaneous Fluid Removal" system, an absorbent medium is situated between the fluidic chamber and slide surface, allowing for the removal of liquid into the adjacent absorbent medium simultaneously as the centrifugal force is applied. Theoretically, the denser cells of interest must have sedimented to the slide surface prior to the removal of liquid as doing so otherwise would result in cells still suspended in medium being drawn into the adjacent absorbent element and being lost. The other approach to cytocentrifugation features a liquid-tight seal between the fluidic chamber and slide surface that does not allow for the removal of liquid during centrifugation. In fluid-retention cytocentrifugation, the cells of interest are sedimented while surrounded in their supportive liquid medium and the removal of fluid is performed after centrifugation. The comparatively denser cells of interest in liquid medium are still preferentially sedimented to the slide surface.

Fluid-retention cytocentrifugation presents a number of benefits but also poses some challenges from the standpoint of sample manipulation. As the cells are sedimented in a liquid medium that provides relative buoyancy (i.e., resistance to sedimentation) as opposed to a complete lack of buoyancy when centrifuged in air, a higher amount of centrifugal force is required for the denser cells to overcome the fluidic resistance. The presence of cells in liquid medium presents an advantage, as the cells being sedimented experience less force pressing them against the slide, aiding in the preservation of delicate morphological features. The lack of simultaneous fluid removal also presents the benefit of effectively removing all avenues by which cells of interest can be lost during the centrifugation process. By principle of being liquid-tight, the fluid which contains cells of interest are restricted to remain within the chamber and contact the slide surface—as such, cells suspended in the liquid medium are also restricted to remaining within the chamber and settling to the slide surface.

A limitation presented by the fluid-retention method of cytocentrifugation is that the processes of fluid removal and cell sedimentation are separated. As such, a separate method of fluid removal is necessary. Considering that the cells do not experience as much centrifugal force owing to the buoyancy of the surrounding medium, it is possible that the cell contact area with the slide is not as large, thus adversely affecting the adhesion of cells to the slide surface. This requires that the process of liquid removal be performed as gently and with as little turbulence as possible. The device and its method of use provides a method of fluid removal from the sample chamber in a controlled manner that minimizes the detachment of cells from the slide surface, thus maximizing the yield of settled cells of interest.

Upon the removal of liquid, the cells are sedimented within a designated area of the slide within the sample chamber. To aid in further downstream processing wherein multiple reagents may be used to incubate or wash the cells, or imaging of sedimented cells is required with the following post-processing so that it is beneficial that the sample chamber is removable. The present device includes a polymer base with protruding hooks that clip into corresponding positions on the sample chamber sitting atop the slide. The clips are designed for ease of assembly but also provide a convenient means by which the end-user can remove the chamber without the use of specialized tools or methods.

To facilitate the manipulation of reagents in downstream processes such as immunofluorescence staining and fluorescence in-situ hybridization where it is optimal that fluid volumes are minimized to reduce assay costs, the device can include hydrophobic printing on surfaces other than the exposed bio-adhesive area. The hydrophobicity of the printed surface serves as a convenient reagent well that can hold small volumes of liquid (the capacity of the well is 10 to 200 µL) but also by the means of retaining the liquid in a controlled area, the cells of interest are also limited to a designated area, allowing for the strict localization of the sample and minimizing loss due to downstream processes.

To maximize the ability of the cells of interest to adhere to the slide surface and resist detachment, the slide surface was functionalized with a bio-adhesive coating to modify the surface interactions of the sedimented cell with the slide. The design of the device wherein a slide is held in a polymer base that clips together with a chamber that is sealed onto the slide via a gasket allows the device to be compatible with virtually any microscope slide that fits within the base. Thus, a wide range of functionalized slides were tested in the device and evaluated for cell adhesion performance. As the slide is easily detachable from the rest of the device components it allows the device to be compatible with virtually any microscope including both upright and inverted microscopes. Also, the slide with the sedimented cells is compatible with other types of standard equipment such as, for example, slide staining devices. Cultured SK-BR-3 cells pre-labelled with CellTracker™ Green were spiked into 1×PBS to create a cell suspension and added to the sample chamber. Upon centrifugation, the supernatant was removed, and the cells fixed by incubation in ice-cold Methanol for 5 minutes followed by detachment of the sample chamber. The resultant slide containing sedimented cells was washed by running 1X PBS over the sample surface 3 times using a micropipette to induce cell detachment. The subsequent slide surfaces were imaged under FITC and the cell density evaluated. As a result, Poly-L-Lysine showed the highest density of cells. Thus, this surface modification was chosen as the primary slide surface for the present device. Other types of coatings can be used for surface functionalization instead of Poly-L-Lysine such as proteins, silanes, organic polymers, inorganic metals. For example, other forms of poly-lysine, silane coatings, gelatin, fibronectin, gold or silver coatings and other coatings enhancing cell adhesion to a solid support. Other methods of enhancement of cell adhesion to the surface of the solid support can be used such as surface structure modification, etching, plasma treatment.

Different materials can be used as a solid support such as glass, different types of plastic or quartz.

Figure 2A:
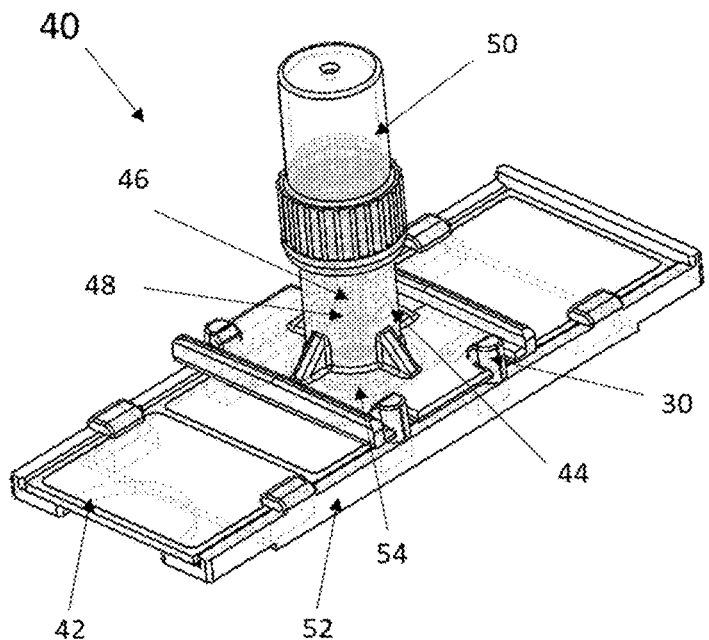
FIG. 2(a) is a perspective view of the assembled cell retention device 40 for cell sedimentation, post centrifugation with reduced cell losses (increased retention rate) and improved morphology of retained cells.

Referring to FIGS. 1 and 2(a), FIG. 1 shows a flow diagram at 100 of the cell retention method using the cell harvesting device disclosed herein. In step 12 a fluid sample with the cells being isolated is introduced into a fluid chamber 44 (FIG. 2(b)) which is coupled to a solid support 42 both of which form part of the device described below. In step 14 the fluid sample is then subjected to centrifugation which forces the cells to move towards the solid support 42 which induces sedimentation of the cells and promotes cell adhesion to the solid support. After centrifugation, after which in step 16 the fluid is removed under controlled conditions by carefully controlling the fluid removal rate in step 18 and actively controlling the remaining fluid in step 20. Carefully controlling the fluid is advantageous in that it prevents cell detachment from the solid support due to excessive forces which may appear when the flow rate is high, and the stress level exceeds adhesion forces keeping the cells of the surface of the solid support during centrifugation or after centrifugation is completed. Also, removal of the fluid after completion of the centrifugation step eliminates removal of the cells which still may be present in the solution (not bound to the surface) if centrifugation is not finished. In addition, the proposed method requires control of the volume of the fluid remaining in the fluid chamber after completion of the fluid removal step. This is required for preserving cell morphology as the cells remain wetted at all steps of the process. The volume of the remaining fluid depends on the fluid parameters (surface tension and contact angle) as well as the inner diameter of the fluid chamber 44 and the distance between the solid support 42 and the tip of the absorbing element 46. The volume basically is controlled by a proper selection of the above-mentioned distance between the tip of the absorbing element 46.

If multiple steps are required for cell post processing (for, example staining, washing, etc. as shown in step 24) addition of reagents is conducted with a controlled fluid delivery rate. This allows to prevent detachment and removal of the cells adhered to the solid support in the preceding steps of the method. The following steps of fluid removal are conducted with a controlled fluid removal rate and control of the remaining volume of fluid as described above, with the above being illustrated in step 26.

Following the preparation step 24, the prepared cells are then subject to the desired analysis, whether it be molecular analysis in step 28 or imaging in step 30.

Figure 2B:
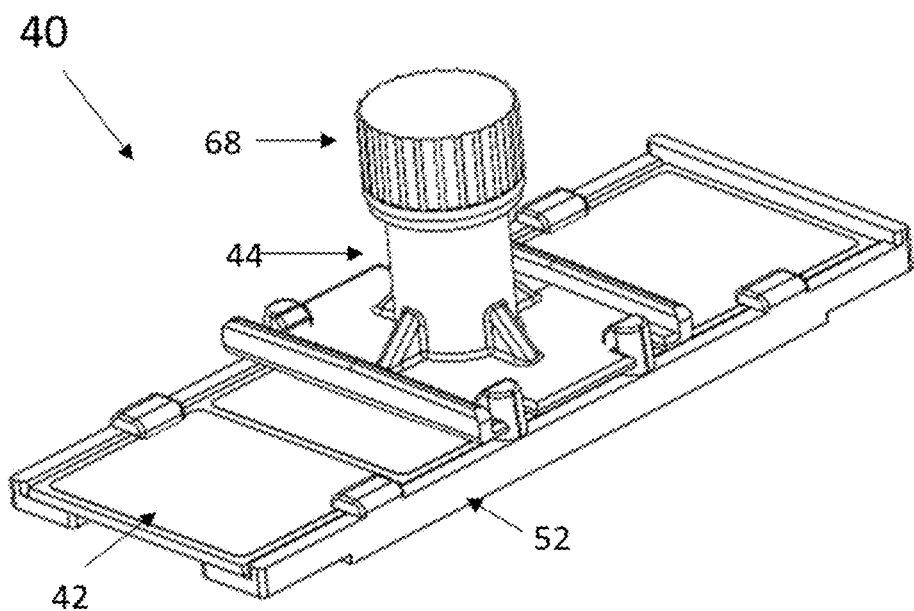
FIG. 2(b) shows an assembled cell retention device configured for centrifugation ready to be positioned in a centrifuge (not shown).
Figure 2C:
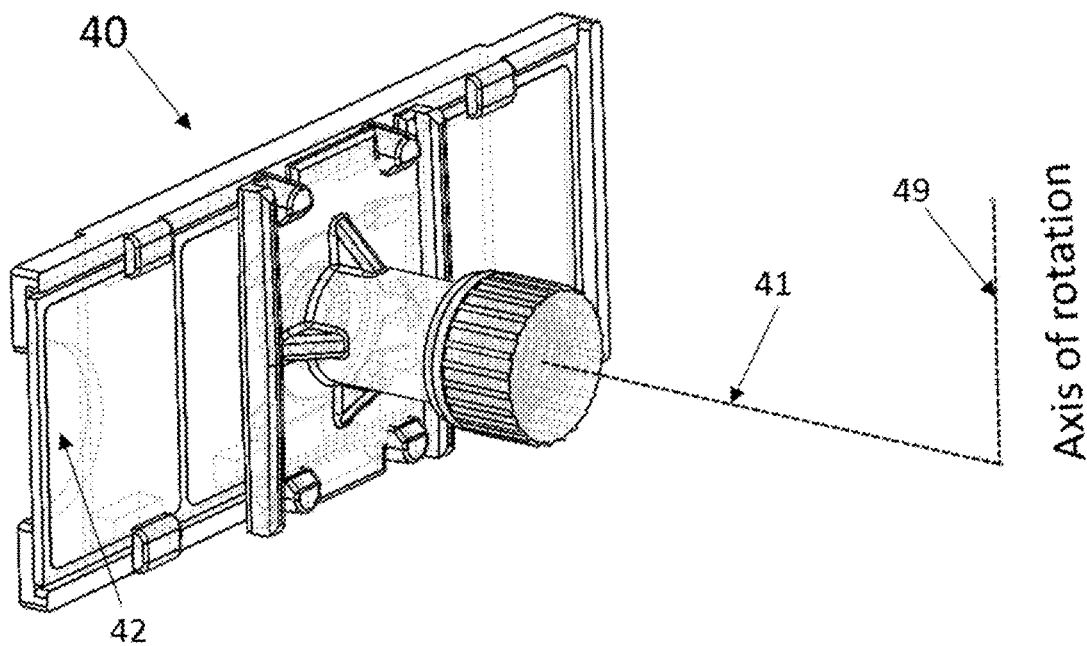
FIG. 2(c) shows an assembled cell retention device positioned in a centrifuge (not shown) so that the normal 41 to the surface of the solid support 42 intersects the axis of rotation and the long axis of the solid support 42 is in the plane of rotation.
Figure 2D:
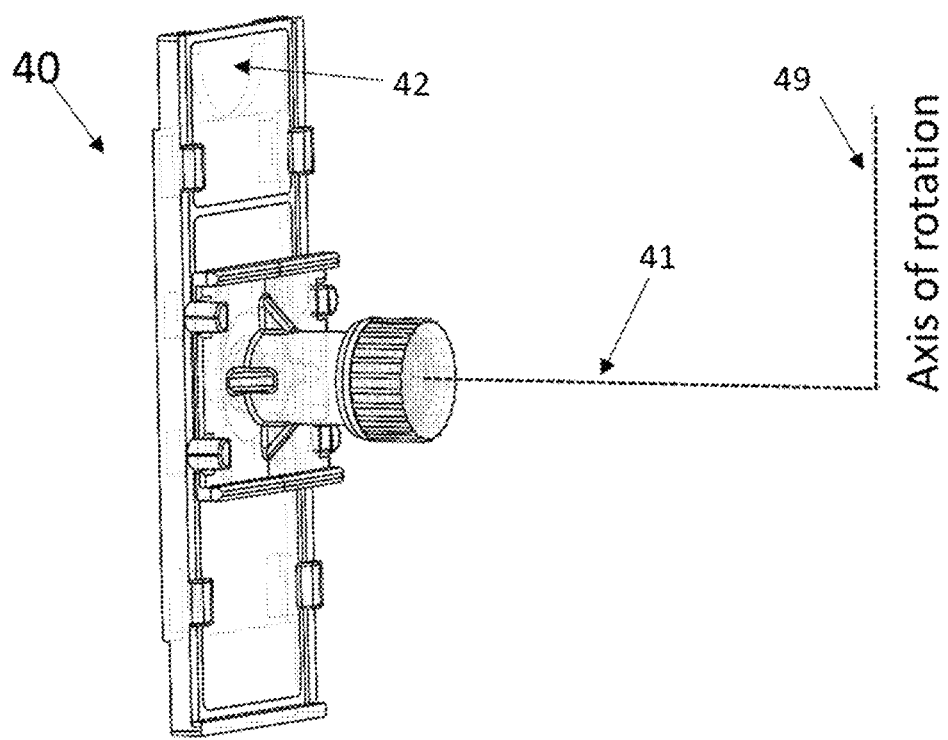
FIG. 2(d) shows an assembled cell retention device positioned in a centrifuge (not shown) so that the normal 41 to the surface of the solid support 42 intersects the axis or rotation and the long axis of the solid support 42 is perpendicular to the plane of rotation.
Figure 3:
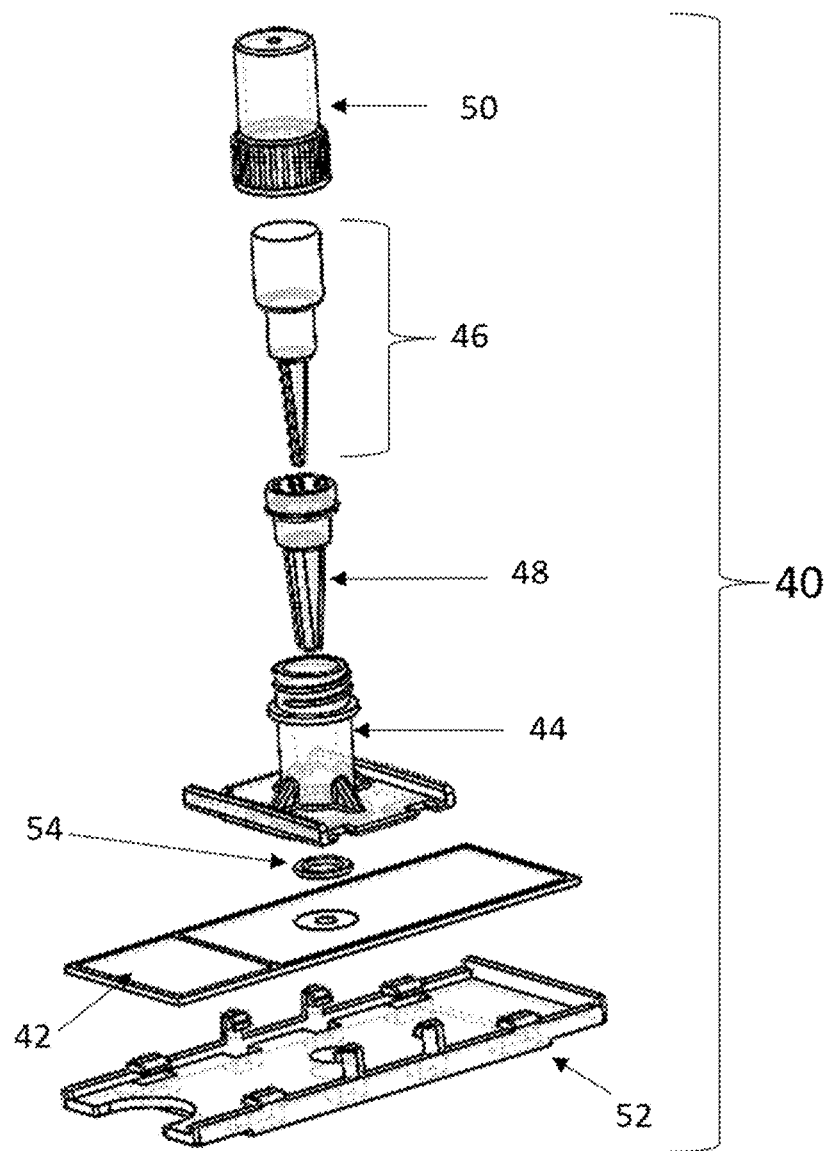
FIG. 3 is an exploded view of the cell retention device for cell sedimentation with reduced cell losses (increased retention rate) and improved morphology of retained cells.
Figure 7E:
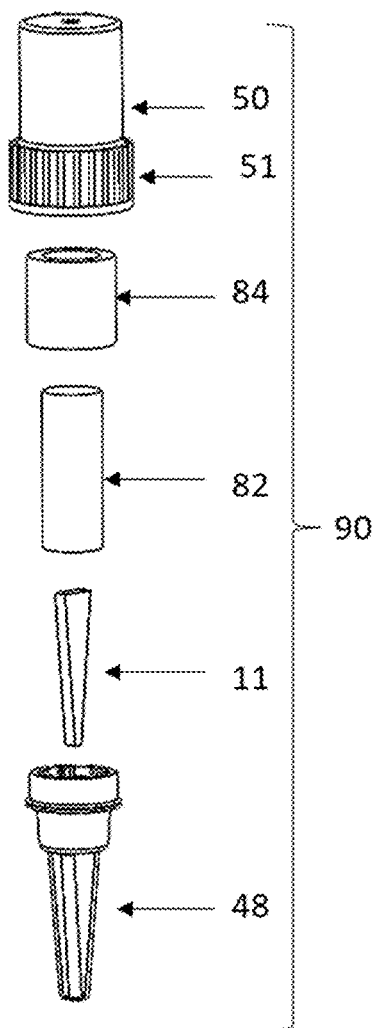

Referring to FIGS. 2 and 3 the assembled cell retention device shown generally at 40 for cell sedimentation with reduced cell losses (increased retention rate) and improved morphology of retained cells and includes substrate 42, a fluid chamber 44, and includes either a wicking cap 50 shown in FIG. 2(a) or a protection cap 68 shown in FIG. 2(b) and absorbing element 46 extending from the cap 50 down into an enclosure 48 and being in flow communication with the cell containing liquid which is placed in the fluid chamber 44 and wherein the absorbing element extends for the absorbing element rod 46, a wicking cap 50, a base 52 and a fluid chamber gasket 54. The absorbing element 46 can be made as a single piece element as shown further in FIG. 15 or may consist of multiple components as shown in FIG. 7(b), FIG. 7(c) and FIG. 7(e). In the latter case the components are placed in contact so that that fluid flow is possible between these components. The absorbing element 46 is assembled with the cap 50 and an enclosure 48 so that when they are installed into the fluid chamber 44 the tip of the absorbing element 46 is separated from the surface of the substrate 42 to a predefined distance. Substrate 42 is mounted on base 52 such that it can be easily detached once the cells have been collected. Fluid chamber 44 is positioned on the top of the slide 42 which is inserted into the base 52 and is retained by the hooks 30.

The fluid chamber 44 is releasably attachable to the base as will be described herein after. Different methods of attachment of the fluid chamber 44 to the slide or the base containing the slide may be based on use of adhesives (FIGS. 16(a) to 16(b) or mechanical retention as shown in FIGS. 17(a) to 17(f) using retaining features 30 when the fluid chamber is pressed in, or 31 when the top of the element 31 is melted and formed a retention feature 32; or by hooks 34 and 35 aligned by rotation for proper retention of the fluid chamber 44.

Figure 4A:
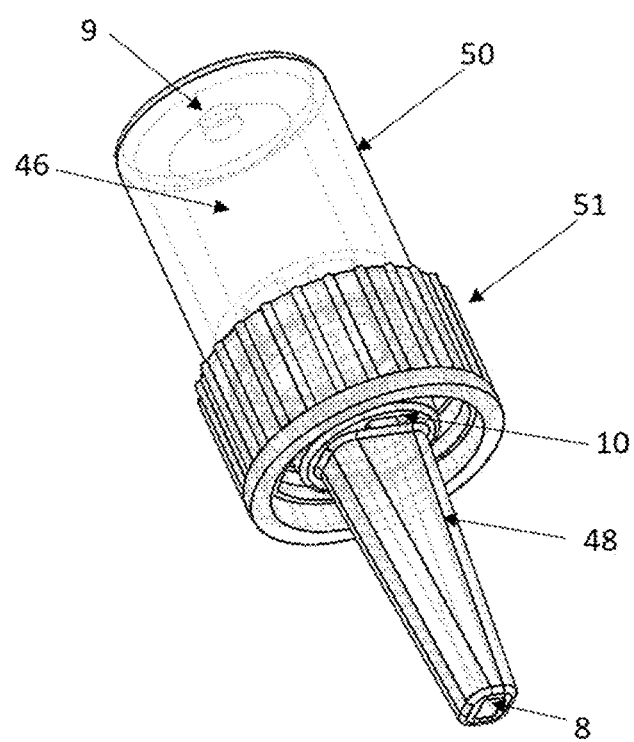
FIG. 4(a) is a perspective view of an absorbing element 46 in a plastic enclosure 48 forming part of the cell retention device.
Figure 4B:
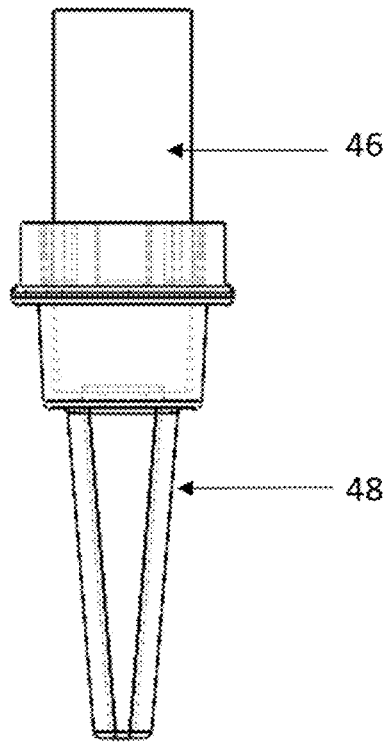
FIG. 4(b) is a front view of the absorbing element 46 in the plastic enclosure 48 of FIG. 4(a).

FIG. 4(a) is a perspective view of an absorbing element 46 in a plastic enclosure 48 while FIG. 4(b) is a front view of the absorbing element 46 in the plastic enclosure 48 of FIG. 4(a). The plastic enclosure 48 can be pressed into the cap 50 or can be retained by the adhesive. The plastic enclosure 48 is equipped with a overfill protection features 10 shown in FIG. 6(a). The cap 50 is equipped with riffles 51 on the side surface for ease of use and with a hole 9 on the top of cap 50 to allow release of the differential pressure which may be created during the wicking process.

FIG. 5(a) is a perspective view of the tip of the plastic enclosure 48 the absorbing element 46 with a rectangular opening 8 at the tip of the enclosure 48 and FIG. 5(b) shows the tip having a circular cross-section opening shown at 8a. Other shapes of openings are possible as well as long as the cross-sectional area in a combination with other parameters of the absorbing element 46 provides the required flow rate of fluid at the wicking stage of the process.

FIGS. 6(a) to 6(e) show various implementations of controlling the wicking rate during the process of fluid removal after completion of cell sedimentation according to the proposed method. FIG. 6(a) shows that controlling of the fluid removal rate can be achieved by selection of the cross-sectional area of the opening 8 in the plastic enclosure 48 which has the rectangular shape as shown in FIG. 5(a). FIG. 6(b) shows how this result is achieved by selection of the distance between the plastic enclosure 48 containing an absorbing element 46 and the substrate 42. It is noted that the result mentioned above can also be achieved by a combination of cross-sectional area and the distance mentioned above. FIG. 6(c) shows control of the fluid flow rate by selection of the geometry of the absorbing element 46.

FIG. 6(d) is a photograph showing control of the fluid flow rate can be achieve by using an additional capillary tube 14 attached to the porous material 15 and selection of capillary length and inner diameter. FIG. 6(e) shows the capillary 14 attached to the porous material 15 with continuously increasing cross-sectional.

FIGS. 7(a) to 7(e) progressively shows more components related to the absorbing element 46 forming part of the present device. FIG. 7(a) shows the tip of the absorbing element 46 placed above the functionalized surface of the solid support 42. This figure shows the porous flat component 11 in the proximity to the surface used for retention of cells. As it is described further the shape, type of porous material and the distance between the tip of absorbing element and the solid support 42 defines the wicking rate and all these parameters are optimized to reduce the cell loss which can be caused by excessive flow rates. FIG. 7(b) shows the absorbing element 46 composed of the flat absorbing tip 11 and cylindrical porous element 82 above absorbing element 11 for increase of the wicking capacity (maximum volume of liquid which can be absorbed by the element 46. Other configurations of these components are also possible: for example, the element 11 can be made conical with different cross-section; the element 82 referred as a cylindrical element can be made with a square or rectangular cross-section.

The elements 11 and 82 are placed in contact with each other to ensure uninterrupted fluid flow. As a result, these components act from the wicking point of view as a single combined absorbing element 46. FIG. 7(c) shows additional increase of the wicking capacity by using the hollow cylindrical porous element 84 into which item 82 is inserted. In a multicomponent absorbing element not only the shape of the elements but also their porosity may be selected iso that the wicking rate and total volume provides required performance. FIG. 7(d) shows plastic enclosure for the absorbing element 46 containing plastic cavity 48 and a cap 50 allowing good contact between the parts of the absorbing element 46 and allowing wicking of liquid only through a controlled opening 8 (not shown) in the bottom of plastic cavity 48. Cap 50 is also equipped with the riffles on the side surface of the cap for ease of use.

FIG. 7(e) shows the exploded view of the encapsulated multicomponent absorbing element 90. Another embodiment of the encapsulated absorbing element 90 contains the plastic cavity 48 the cap 50 and a molded single-component porous absorbing element 46 shown further in FIG. 15(a) and FIG. 15(b).

FIG. 8(a) shows the tip of the absorbing element 46 in the enclosure 48 and a sealing gasket 54 attached to the surface of the solid support 42 or substrate 42 which creates a cavity for the reagents. FIG. 8(b) shows an embodiment of a gasket 60 in which a protruding element 62 is added to gasket 54. The purpose of protruding element 62 is to simplify detachment of the gasket 54 from the slide upon completion of the stages of the process preceding microscopic imaging.

The gasket 54 may have circular, rectangular or square cross sections. They can be affixed to the bottom of fluid chamber 44 by being glued to the bottom of chamber 44 circumferentially extending around the are onto which the target cells sediment. Alternatively, the gasket 54 can be retained in grooves complimentary to the size and shape of the gasket built into the bottom of chamber 44. Alternatively, the gaskets can be retained on the surface of the solid support 42 and not attached to chamber 44. It will be appreciated that gaskets may be optional as there are other ways known to those skilled in the art to make a liquid tight seal between chamber 44 and solid support 42.

Figure 8E:
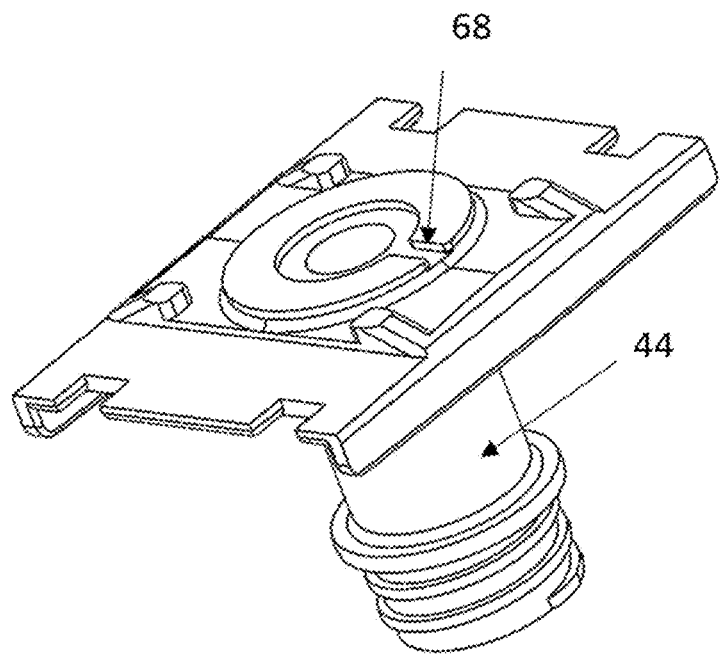
Figure 8F:
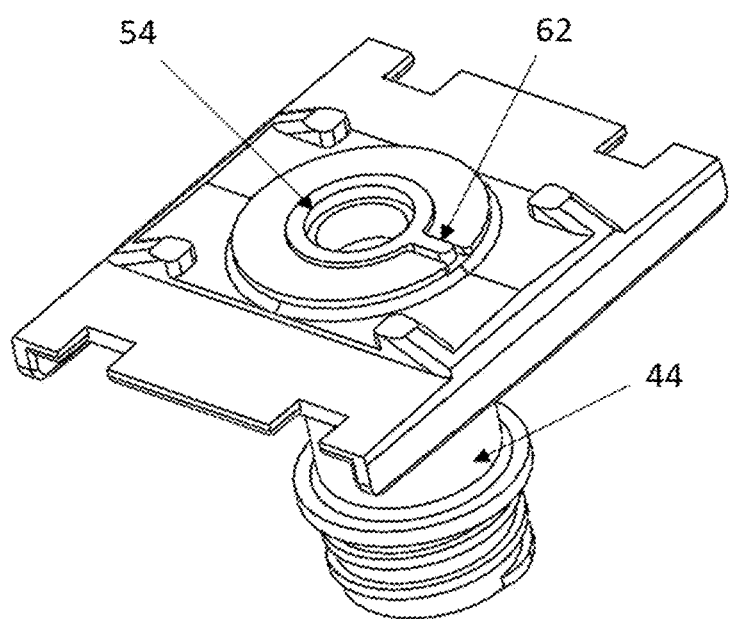

FIGS. 8(c) to 8(f) is a bottom view of the fluid chamber 44 showing a groove 66 (FIG. 8(c)) having a size for accepting gasket 54 (FIG. 8(d)). FIG. 8(e) shows the fluid chamber 44 in which an additional groove 68 is added to the bottom of the fluid chamber 44 to accept protruding element 62 of gasket 54 (in which the gasket is absent in FIG. 8(e). FIG. 8(f) shows the gasket 54 with its protruding element 62 installed in the fluid chamber 44.

Once the target cells have been sedimented on the top surface of solid support 42, the fluid chamber 44 is full of liquid absent the cells. At this point the absorbing element 46, which is installed into housing 48 along with wicking cap 50, is inserted into fluid chamber 44 and secured therein by the leak-tight wicking cap 50. The goal of the absorbing element 46 is to take up the liquid from the fluid chamber 44 in such a way that the cells are not damaged, deformed or released from the surface of support 42 during removal of the liquid. This is achieved by the design parameters primarily of the absorbing element 46, and secondarily housing 48 and cap 50 which in combination with the design parameters of the housing 48 defines the distance between the absorbing element 46 and its tip and the surface of the support 42.

With respect to the absorbing element 46, the fluid absorbing element is designed to have a cross-sectional area, a distribution along an axis of the fluid absorbing element 46 and a porosity in a range to provide control of the rate of absorption of the fluid into the absorbing element 46 along its length and up through the tip spaced from the top surface of the solid support 42, in order to give a controlled removal of the liquid out of fluid chamber 44. The mechanical design of the housing 48 is also optimized to assist in the optimum removal of the liquid. The first is the design of housing 48 and cap 50 in order to keep the tip of the absorbing element 46 spaced from the top surface of the solid support 42 to position the tip of the fluid absorbing element at a distance from the surface of the solid support 42 shorter than a predefined distance. The distance that the tip of the absorbing element 46 is positioned from the top surface of the solid substrate 42 onto which the target cells have deposited is important for the following reasons.

Detachment of the target cells attached to the surface of the solid support 42 is mainly caused by the shear stress originated by the fluid flow. The shear stress on the target cells produced by the fluid flow is defined by the derivative of the fluid velocity over the distance. The absolute value of the velocity is defined by the flow rate of the fluid, which is in its turn dependent on the design parameters of the absorbing element 46 and the selected porous material it is made from. An increase of the distance between the solid support 42 and the tip of the absorbing element 46 allows reduction of the shear stress and reduces target cell loss. On the other hand, this also slows down fluid removal and may prevent full removal of fluid from the fluid chamber 44 making the process suboptimal or inefficient. Optimization of all design parameters mentioned above and implementation of flow increasing or accelerating features 17 and 17a shown in FIG. 10 (a) and FIG. 10(b) provides reduced the wicking time for removal of the fluid from fluid chamber 44 and allows fluid removal with a decreased cell loss with acceptable time of fluid removal. The fluid flow provided by accelerating features 17 and 17a shown in FIG. 10 (a) and FIG. 10(b) may be significantly higher compared to the flow provided by the absorbing element 46 through the tip 8 of the enclosure 48, but as by the time when the absorbing element is introduced into the fluid chamber 44 there are no cells present in the bulk of the fluid and the distance between the feature 17 or 17a and the support 42 selected to be substantially large there is no cell detachment which is associated with this fluid flow.

In addition to the distance from the top surface of the substrate 46 that the tip is located, the housing 48 may be provided with overflow protection features. FIG. 9 shows is a view of the absorbing element housing 48 showing overflow protection features 10 which comprise openings in the upper wall of housing 48 to facilitate inflow of fluid into housing 48. Protection features are located at the top of the housing 48 and they are in close proximity to the part of the absorbing element 46 having a large cross-sectional area. Also, the cross-sectional area of the overflow feature is large and for direct fluid flow to a part of the absorbing element 46 with a large volume of porous material. As a result, the excessive amount of fluid which may initially be present in the fluid chamber 44 will be absorbed and will not overflow the fluid chamber 44. In addition, these features are located far away from the surface of the solid support 42 where the cells are sedimented at the stage of centrifugation. This guarantees that increase of the flow rate due to the overflow features does not lead to detachment of the cells from the surface and does not lead to cell loss. Example of these overflow feature openings in housing 48 is shown in FIG. 9.

FIG. 10(a) shows a first embodiment of the absorbent material housing fluid chamber 48 having flow accelerating features 17, which are elongate slots. FIG. 10(b) shows a second embodiment of the absorbent material housing 48 having features 17a, which are circular holes. The presence of the features 17 or 17a is to provide an increase of the wicking rate without negative impact on cell retention. This is achieved by placement of features 17 or 17a further away from the tip of the housing 48 and as a result at a large distance from the surface 42 where the cells are sedimented. Increase of the wicking rate may be required in order to reduce the sample process time.

Figure 11A:
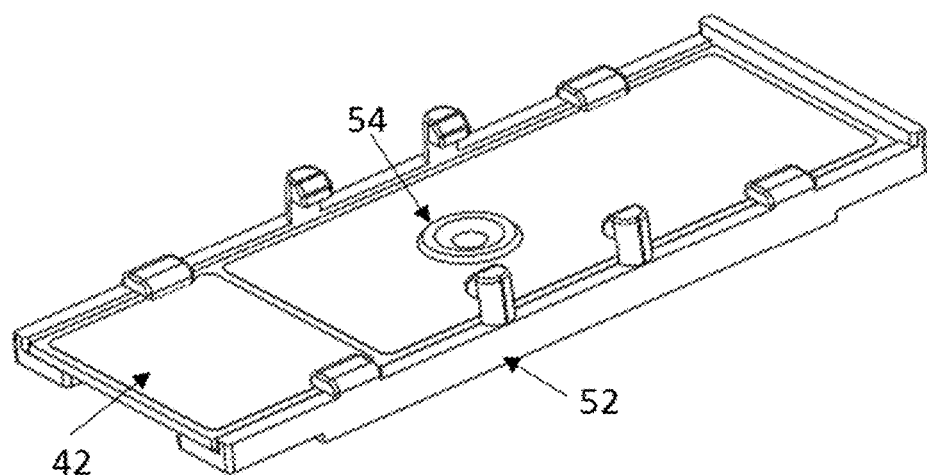
FIG. 11(a) shows a perspective view of the solid support 42 in a form of a glass slide with region of the surface being functionalized with the fluid chamber 44 detached with gasket 54 surrounding the functionalized region.
Figure 11B:
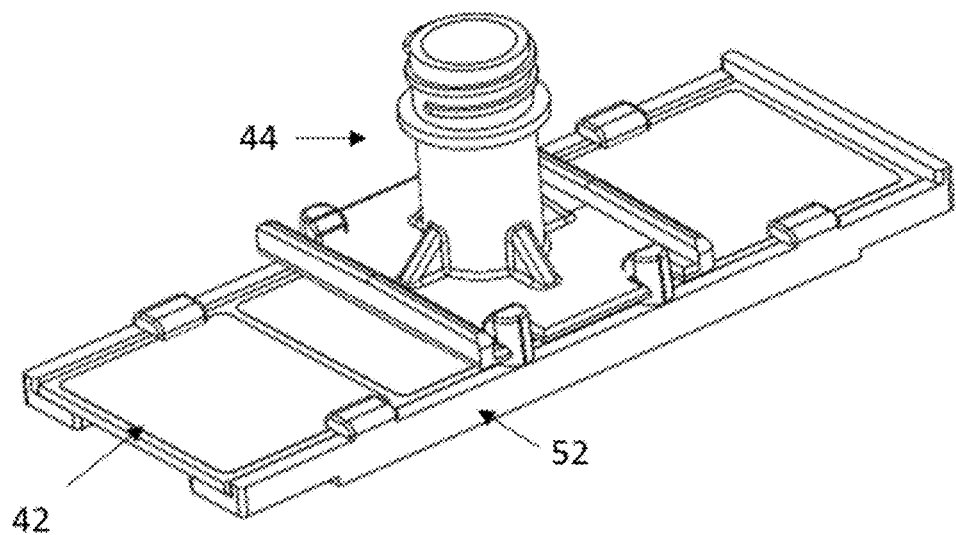
FIG. 11(b) shows the re-attached fluid chamber 44.

FIG. 11(a) shows a perspective view of the solid support 42 in the form of a glass slide with a functionalized region of the surface of the glass slide being surrounded by gasket 54 with the fluid chamber 44 detached, and FIG. 11(b) shows the re-attached fluid chamber 44. The ability to detach and re-attach the fluid chamber 44 allows visual control including microscopy (if required) at different stages of the process. Also, re-attachment of the fluid chamber 44 may be required for cell post-processing after completion of the microscopy stage.

Figure 12A:
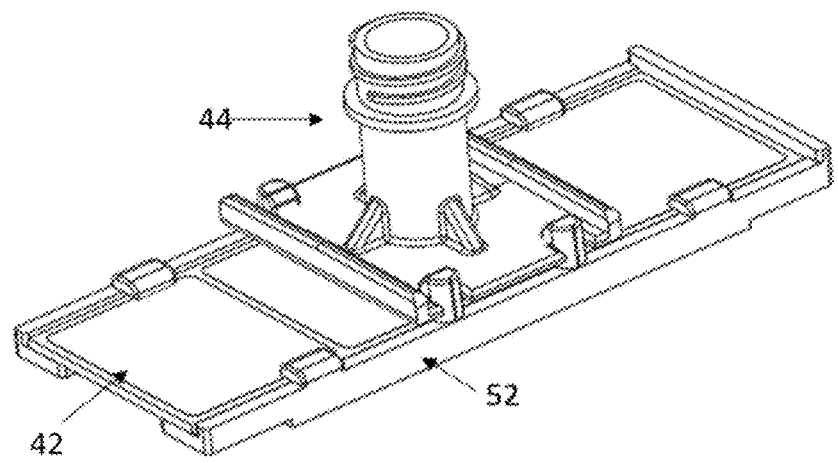
FIG. 12(a) is a perspective view showing the cell retention device partially disassembled at the stage of fluid introduction into fluid chamber 44.
Figure 12B:
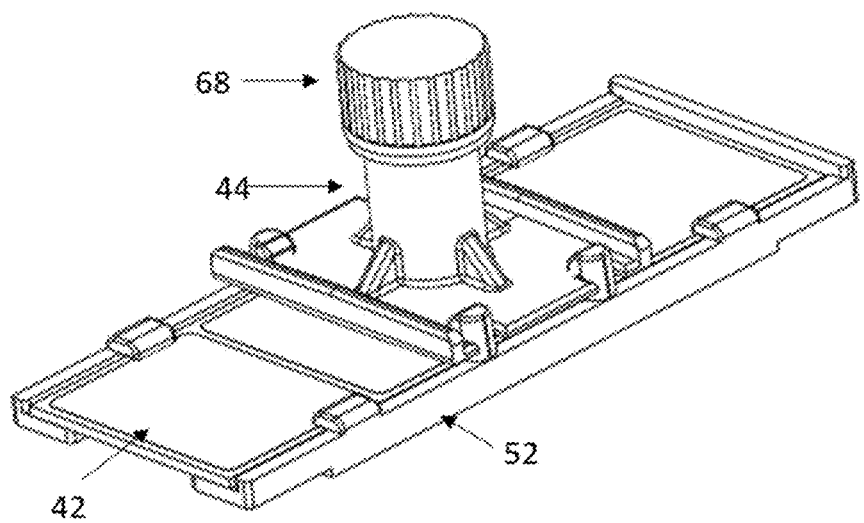
FIG. 12(b) is a perspective view showing the cell retention device assembled with a screw cap 68 after introduction of the fluid sample containing the cells to be harvested.
Figure 12C:
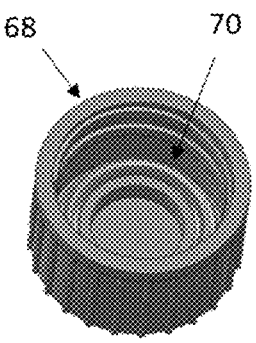
FIG. 12(c) is a perspective view showing the underside view of the screw cap 68 with an O-ring 70 used for leak elimination during centrifugation.

FIGS. 12(a) to 12(c) show the cell retention device at the stage of fluid introduction into fluid chamber 44 in which a first screw cap 68 is removed and the fluid sample flowed into fluid chamber 44, after which the screw cap 68 is screwed onto fluid chamber 44. Screw cap 68 is used at the centrifugation stage of the process in order to prevent an accidental leakage of cell containing fluid. This is achieved by using a gasket 70 shown in FIG. 12 (c) in a form of an O-ring providing a fluid tight connection between the fluid chamber 44 and screw cap 68. Gasket 70 can have other shapes (e.g., flat) as long as the fluid tight connection is achieved. As noted above, cap 68 is used for the centrifugation stage with the intent to prevent leakage of the fluid containing cells from the fluid chamber 44. No fluid removal is anticipated during centrifugation step and this allows to keep the cells in fluid preventing damage of the cells which exist in the devices described in other patents or existing on market. After centrifugation is completed cap 68 is replaced with a second screw cap 50 containing the absorbing element 46. At this stage fluid removal takes place and the fluid is removed in a controlled manner due to proper selection of the porosity of the material used for making and absorbing element 46, selection of the absorbing element configuration/cross-section and the distance between the tip of the absorbing element and the surface of the solid support 42. The distance is defined by the design of the enclosure 48 and design of the cap 50.

Referring to FIGS. 2(c) and 2(d), device 40 is configured to be releasably held in the centrifuge so that an axis 41 normal to the surface of the solid support 42 and coming through the center of the area onto which the targeted cells deposit onto the top surface of the solid support 42 intersects an axis of rotation 49 in the centrifuge. Orientation of the device in the centrifuge may vary depending on a particular centrifuge used and can be placed in the centrifuge so that the long axis of the solid support 42 is in the plane of rotation (as it is shown in FIG. 2(b) or the long axis of the solid support 42 may be perpendicular to the plane of rotation a shown in FIG. 2(c). Other orientations are possible as well due to axial symmetry of the internal cavity of the fluid chamber 44.

Figure 13:
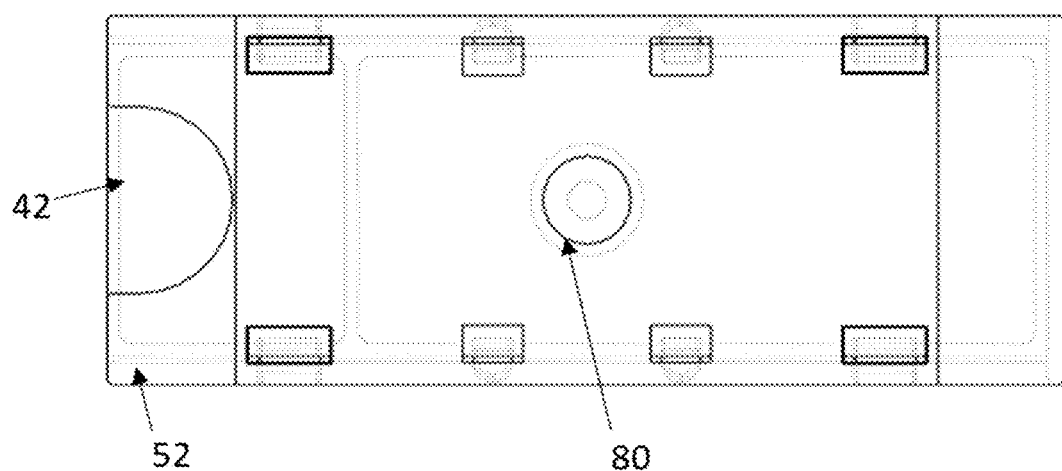
FIG. 13 shows the base 52 of the cell retention device with a hole 80 for fluid and cell visualization without detachment of the fluid chamber 44.
Figure 14:
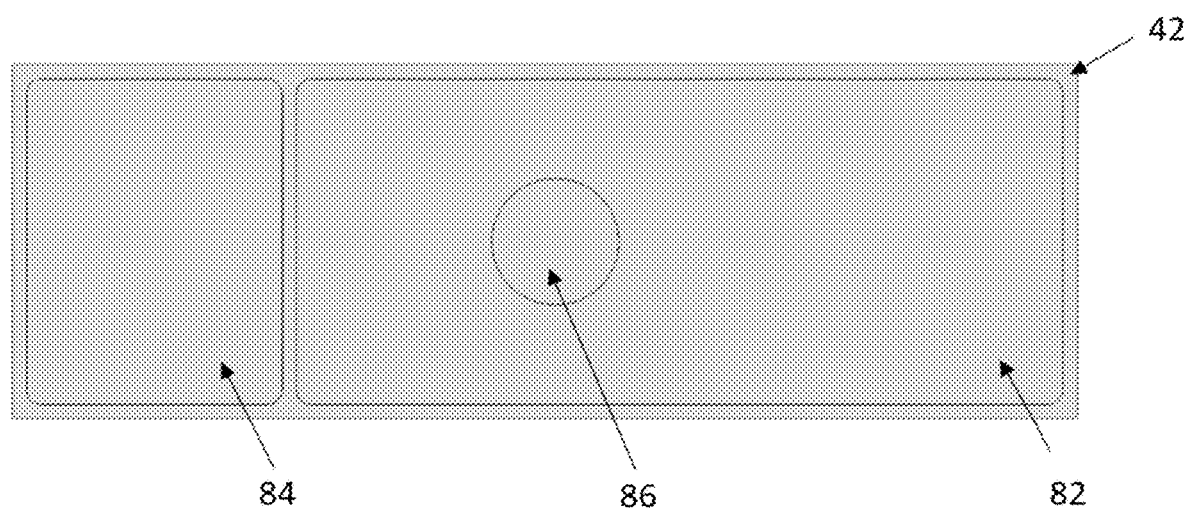
FIG. 14 shows the solid support 42 of the cell retention device with a section 86 of the surface functionalized for capturing cells and Teflon protected layer 82 around the functionalized area 86 and area 84 used for labeling.

FIG. 13 shows the base 52 of the cell retention device with a hole 80 for fluid and cell visualization without detachment of the fluid chamber 44, and FIG. 14 shows the solid support 42 of the cell retention device with a section 86 of the surface functionalized for capturing cells and Teflon protected layer 82 around the functionalized area 86.

Figure 15A:
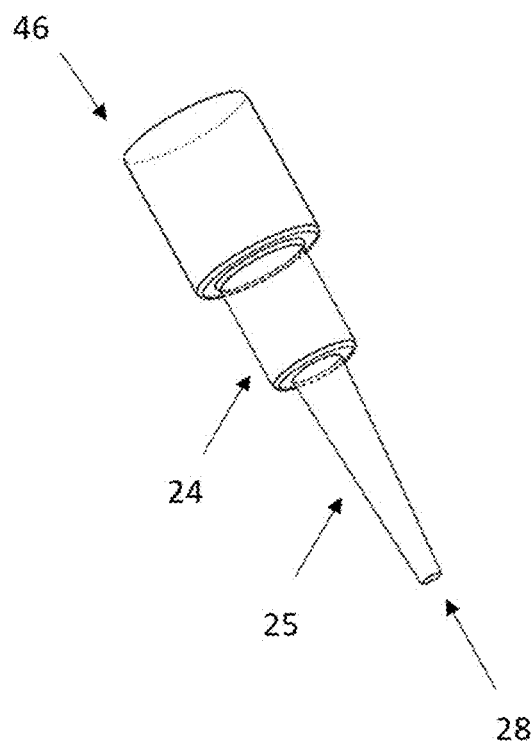
FIG. 15(a) shows a molded single-component absorbing element 46 with a conical tip 25 with circular cross-section 28.
Figure 15B:
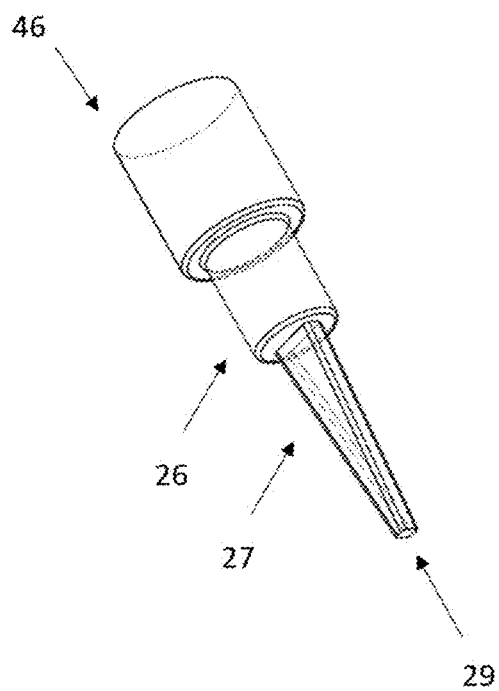
FIG. 15(b) shows the molded single-component absorbing element 46 with a and a flat tip with a triangular shape 27 and rectangular cross-section 29.

FIG. 15(a) shows a molded absorbing element 46 with a conical tip 25 with circular cross-section 28, and FIG. 15(B) shows a molded absorbing element 46 with a flat tip with a triangular shape 27 and rectangular cross-section 29.

Figure 16A:
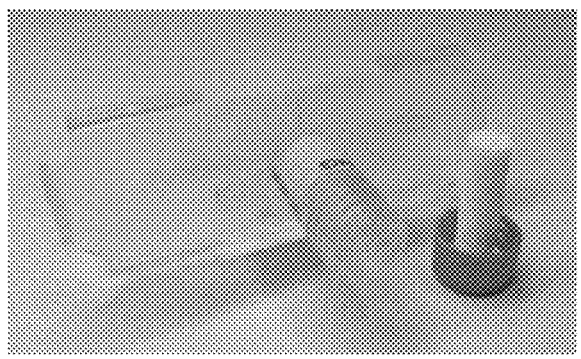
FIGS. 16(a) to 16(d) are photographs showing example embodiments of the present a cell recovery device 40, with a glued in fluid chamber 44.
Figure 16B:
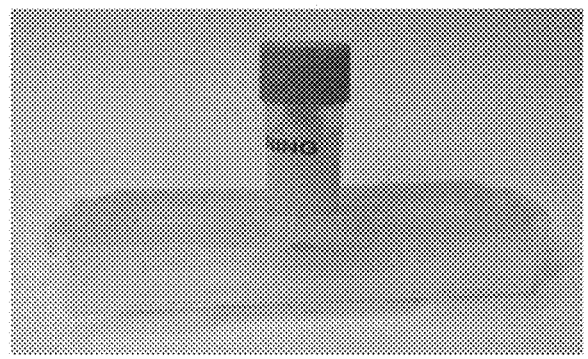
Figure 16C:
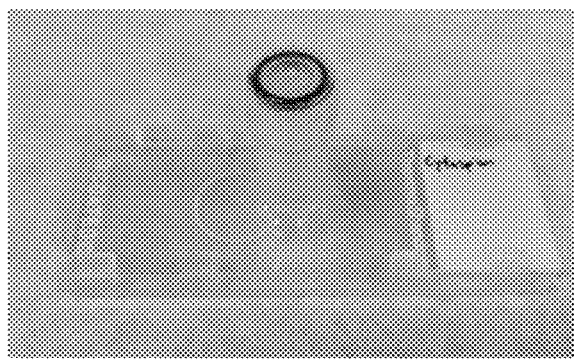
Figure 16D:
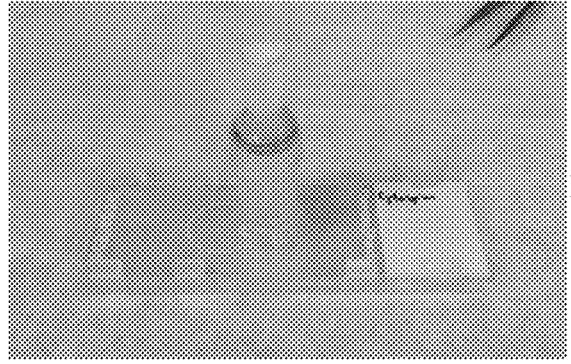

FIGS. 16(a) to 16(b) show another embodiment of the proposed device with the absorbing element detached from the assembly (FIG. 16 (a)) and assembled device with the absorbing element in contact with the fluid (FIG. 16 (b)). FIGS. 16(c) to 16(d) show another embodiment of the proposed device in which the fluid chamber 44 is glued directly to the surface of slide 42. FIG. 16 (c) shows the cap 68 attached to the fluid chamber 44 prior to centrifugation step of the process. FIG. 16 (d) shows the encapsulated absorbing element 46 made of absorbing paper tissue inserted into the fluid chamber 44 for fluid removal after completion of the centrifugation stage.

Figure 17A:
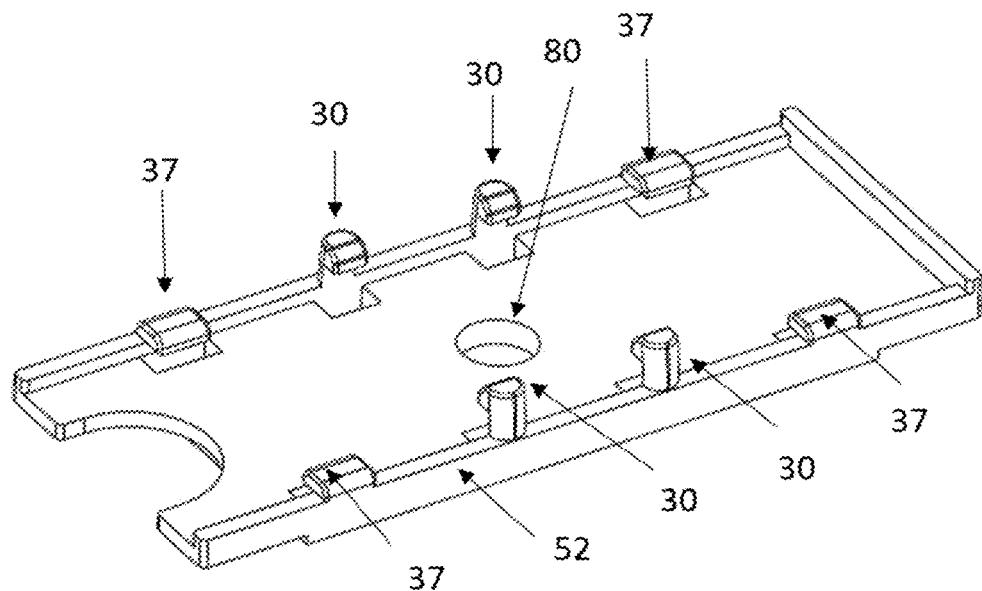
FIGS. 17(a) to 17(f) are perspective views showing in various examples of different methods of retaining parts of the assembly of the cell retention device.

FIGS. 17(a) to 17(f) show examples of different methods of retaining parts of the assembly. The perspective view in FIG. 17(a) shows the base 52 provided with hooks 30 integrally formed with base 52 along the two opposed long edges which are used to retain fluid chamber assembly 44. Centrally located in the base 52 is a hole 80. Located along the two opposed long edges of based 52 are tabs 37 which are used for slide retention.

Figure 17B:
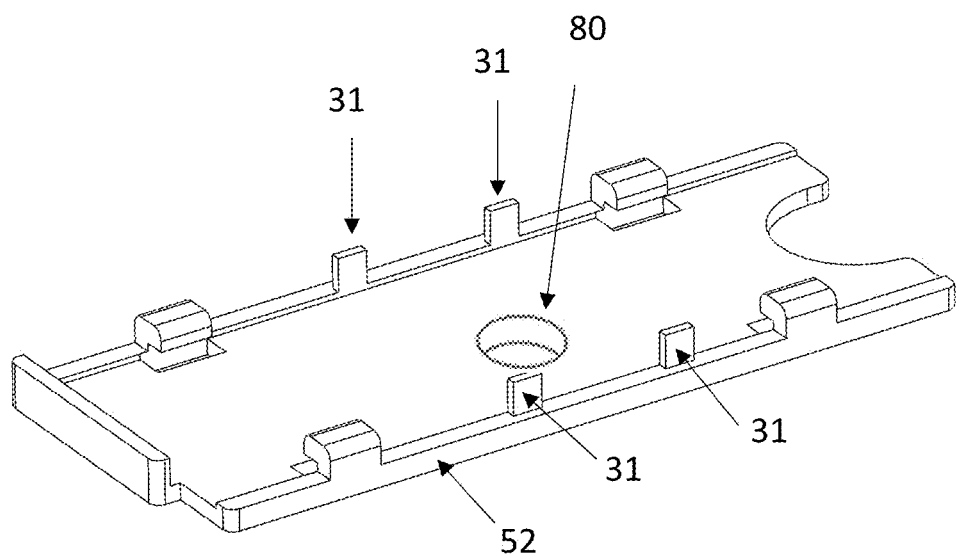
Figure 17C:
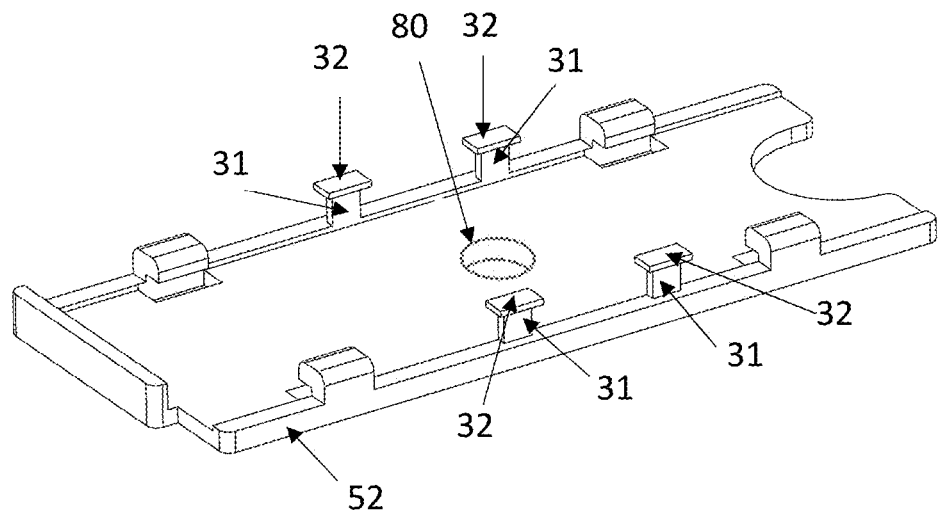

FIG. 17(b) shows base 52 using pins 31 integrally formed therewith instead of hooks 30 as in FIG. 17(a). Pins 31 are compressible using heat so that when fluid chamber 44 is engaged with base 52 the features 32 shown in FIG. 17(c) created by compression under heat of pins 31 prevent detachment of the fluid chamber 44 from the base 52. As the pins 31 are compressed under heat a blob of plastic 32 is created which is larger than an opening through which the pins protrude which keeps the fluid chamber 44 in place.

Figure 17D:
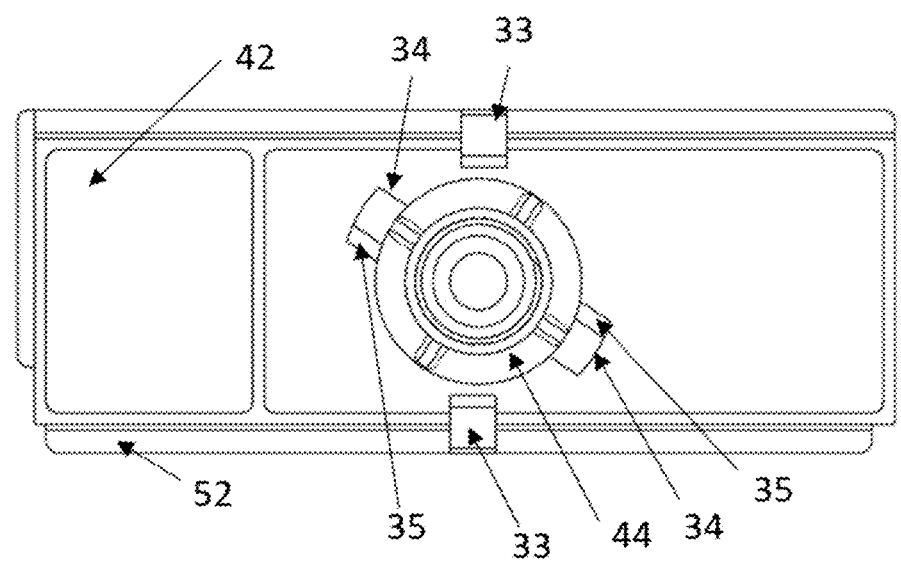
Figure 17E:
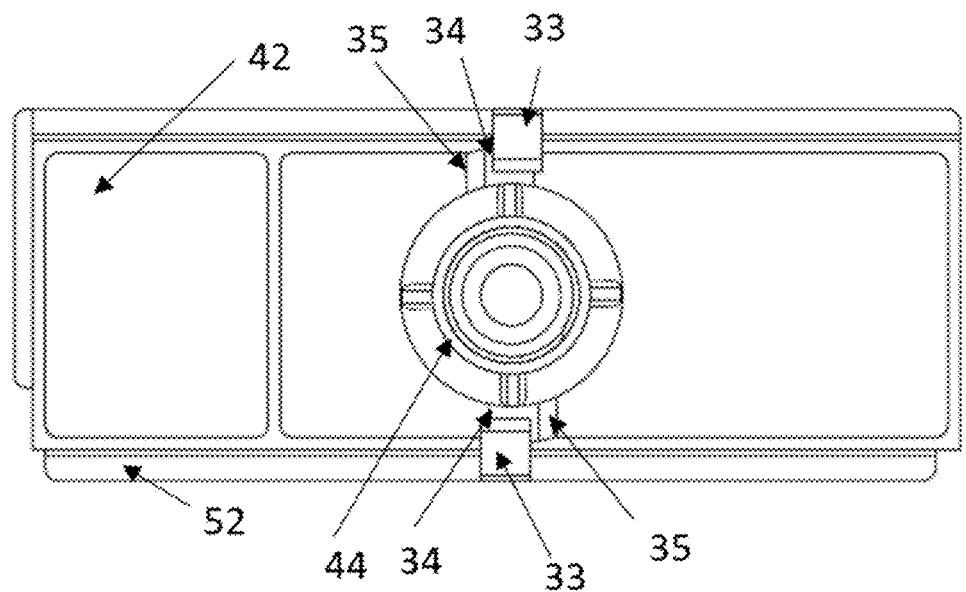

FIGS. 17(d) and 17(e) show another embodiment in which retention of the fluid chamber is achieved retainers 33 engaging with hooks 34 attached to fluid chamber 44 upon rotation of fluid chamber 44. A stopper 35 is added to the hooks 34 to prevent disengagement of the base 52 with the fluid chamber 44. FIG. 17(d) shows the assembly prior to attachment of the fluid chamber 44 to the base 52 and FIG. 17(e) shows the assembled device.

Figure 17F:
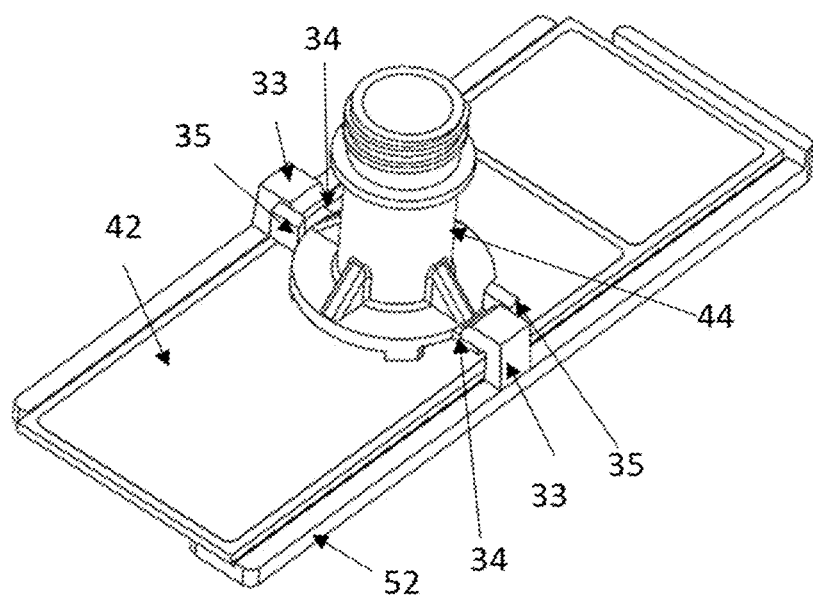

FIG. 17(f) shows the fluid chamber assembly 44 locked onto base 52 using the retainers 33 and hooks 34 when the fluid chamber 44 is engaged by sliding the fluid chamber 44 in the direction of the long side od the base 52 contrary to the embodiment shown in FIG. 17(e) where engagement is achieved by rotation of the fluid chamber 44.

Figure 17G:
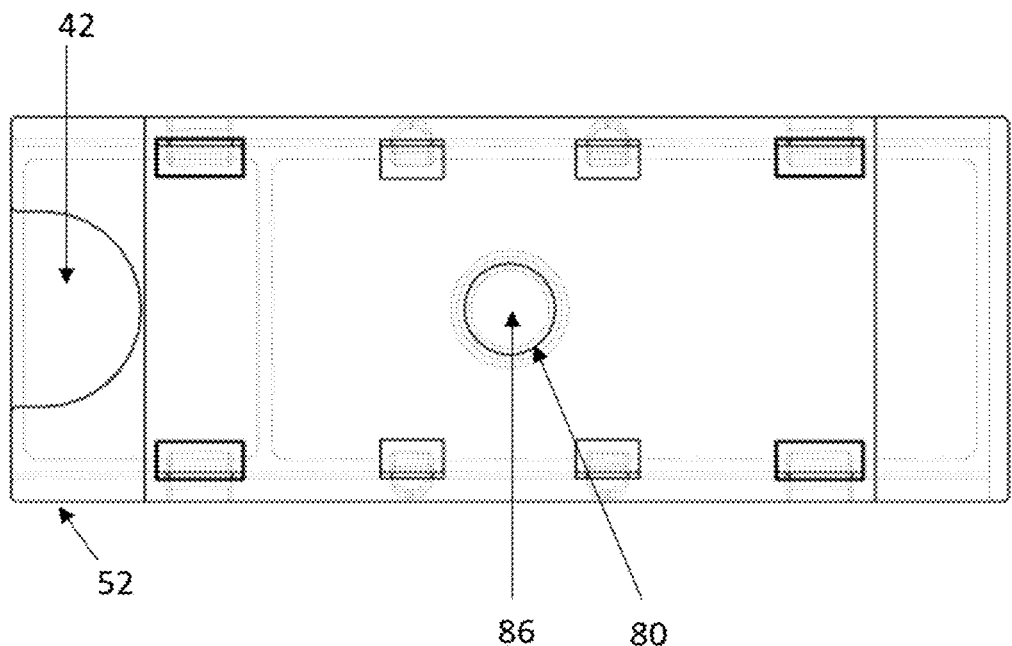
FIG. 17(g) is a bottom view showing the alignment of a slide 42 with functionalized surface 86 region in the assembled device with a bottom opening 80 in base 52.

FIG. 17(g) shows a bottom view of the base 52 with slide 42 retained on the top surface of base 52 with slide 42 including a region 86 which is functionalized with selected agents. Surface functionalization is known to be used for improvement of cells sticking to the surface. Selection of the specific type of functionalization allows increase the retention rate of a particular type of cells which can be used also as a method of enrichment of collected cells or increase of probability of removal of the interfering cells (such as white blood cells) from the surface during the consecutive washing steps following the centrifugation.

Figure 17H:
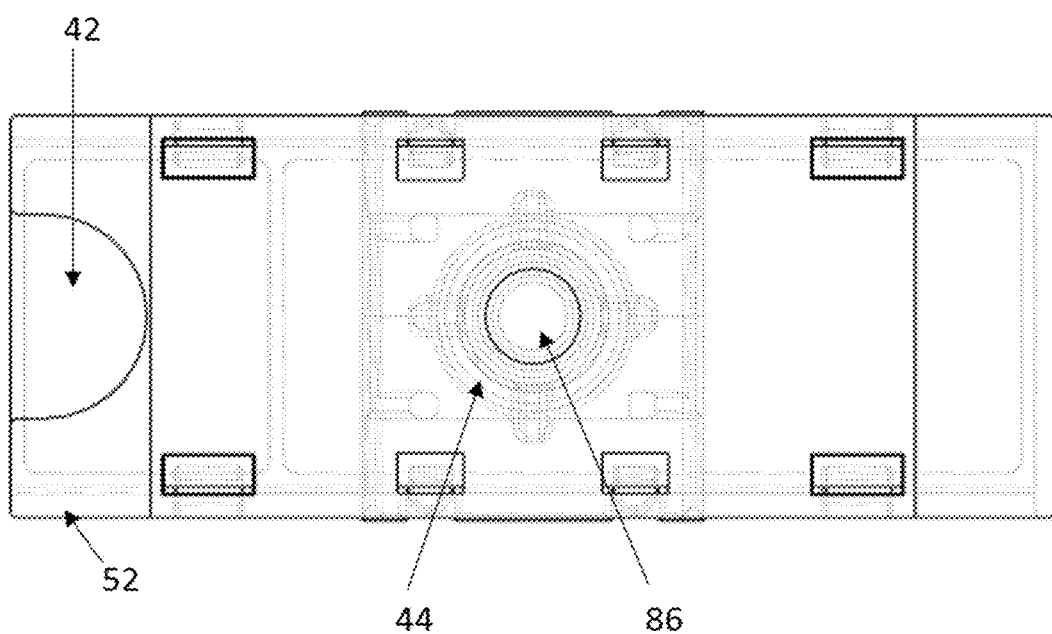
FIG. 17(h) is a bottom view of base 52 showing the alignment of a slide 42 with the functionalized surface region 86 in the assembled cell retention device with a bottom opening in base 52 a fluid chamber 44.

FIG. 17(h) shows alignment of all components of the assembled device 40 which is important for homogeneous sedimentation of cells and unobscured visualization of the area of the slide where the cells are sedimented.

Figure 18D:
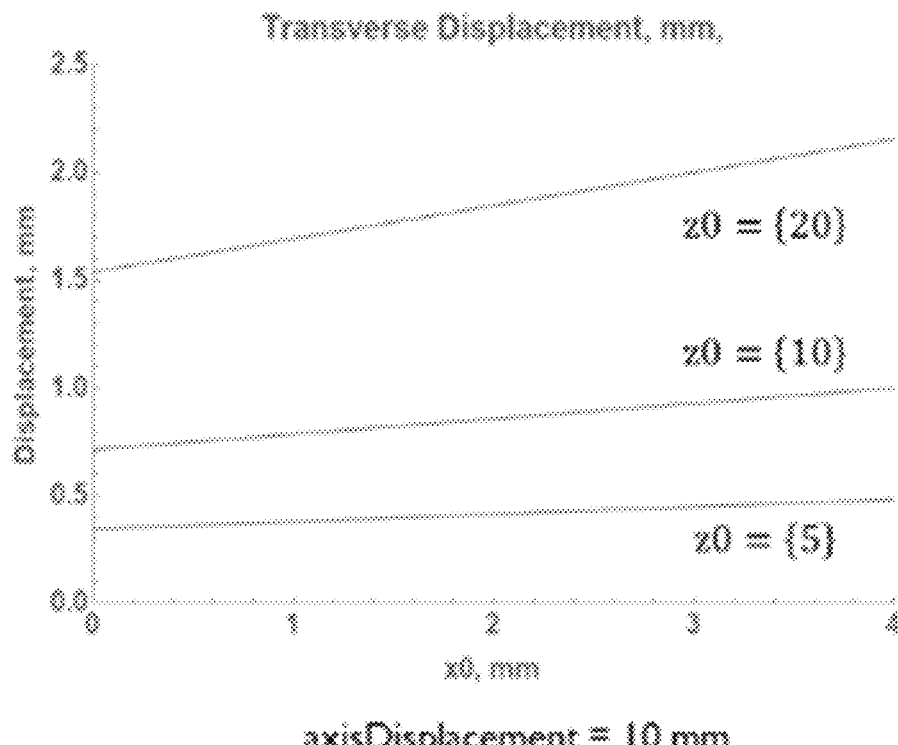
Figure 18E:
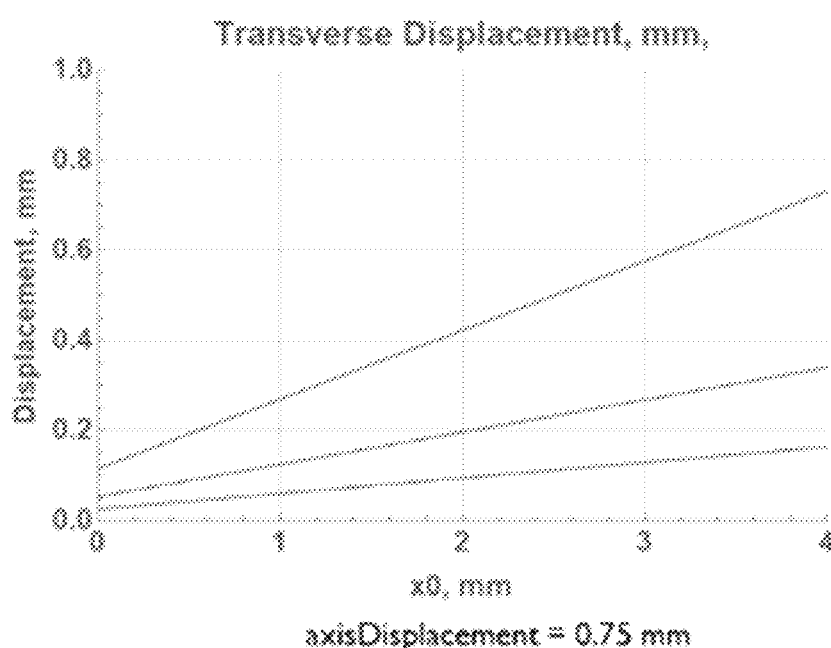
Figure 18F:
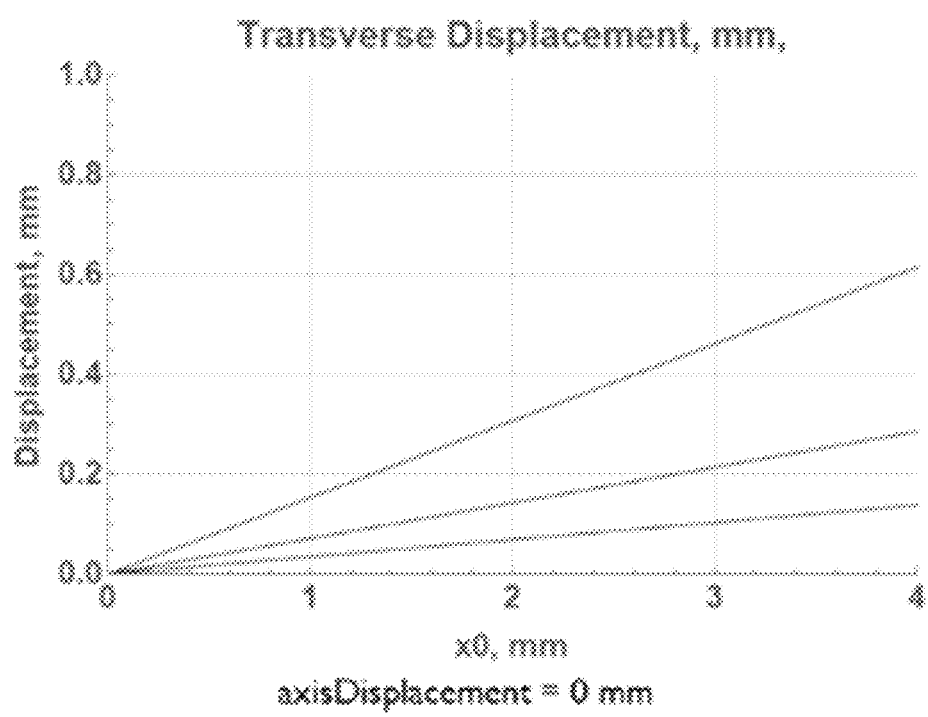

FIGS. 18(a) to 18(f) inclusive show a series of figures showing the importance of proper alignment of the cell recovery device 40 axis relative to the axis of rotation in a centrifuge. FIG. 18(a) shows a schematic representation of the fluid chamber 44 with the cells in a centrifuge with the axis of the device shifted from the axis of the centrifuge, FIG. 18(b) shows force distribution, and FIG. 18(c) shows the resulting inhomogeneous distribution of the sedimented cells. FIG. 18(d) shows plots of calculated displacement of the cells in the direction perpendicular to the axis of rotation from the original position as a function of the initial distance between the cell and the axis of the deice for different displacement of device axis relative to the axis of rotation in a centrifuge for 10 mm, FIG. 18(e) shows the same for a displacement of 0.75 mm and FIG. 18(f) for a displacement of 0 mm.

Figure 19:
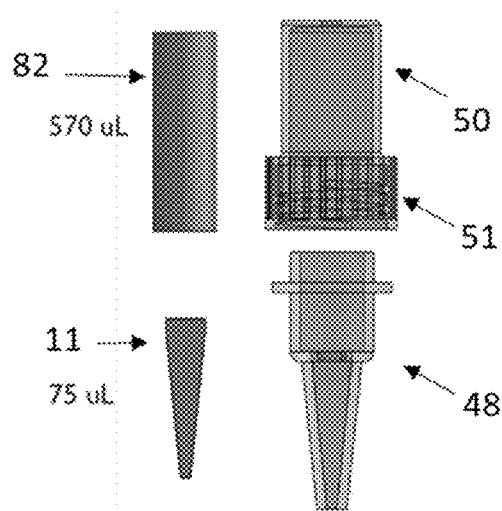
FIG. 19 shows an elevation view of an example of the absorbing element 46 composed of two porous components 11 and 82 and a plastic enclosure for this absorbing element.

FIG. 19 shows an elevation view of an example of the absorbing element 46 composed of two porous components 82 and 11 and a plastic enclosure 48 for this absorbing element 46 with upper porous component 82 having a volume of 570 microliters and the lower element 11 having a volume of 75 microliters. Total volume of the absorbing element in this embodiment equals to 645 microliters. Assuming that the porosity of the material used for the components of the absorbing element 46 is ~30% the total volume of absorbed liquid can be up to 215 microliters which is slightly higher than the typical volume (around 200 microliters) of the harvest produced by cell separation devices (e.g., Parsortix®). Using porous materials with higher porosities may be advantageous as this will allow for higher wicking rates and lager volumes of absorbed fluid (if required).

Figure 20:
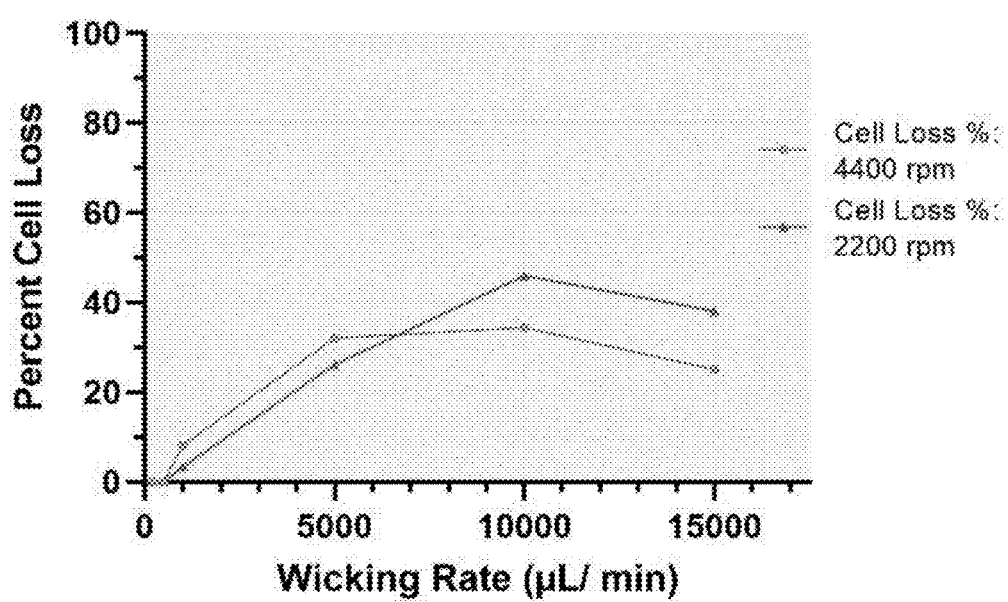
FIG. 20 is a plot of percent cell loss versus wicking rate for two different centrifugation speeds 4400 rpm (circles) and 2200 rpm (triangles).

FIG. 20 is a plot of percent cell loss versus wicking rate for two different centrifugation speeds 4400 rpm (circles) and 2200 rpm (triangles).

Figure 21A:
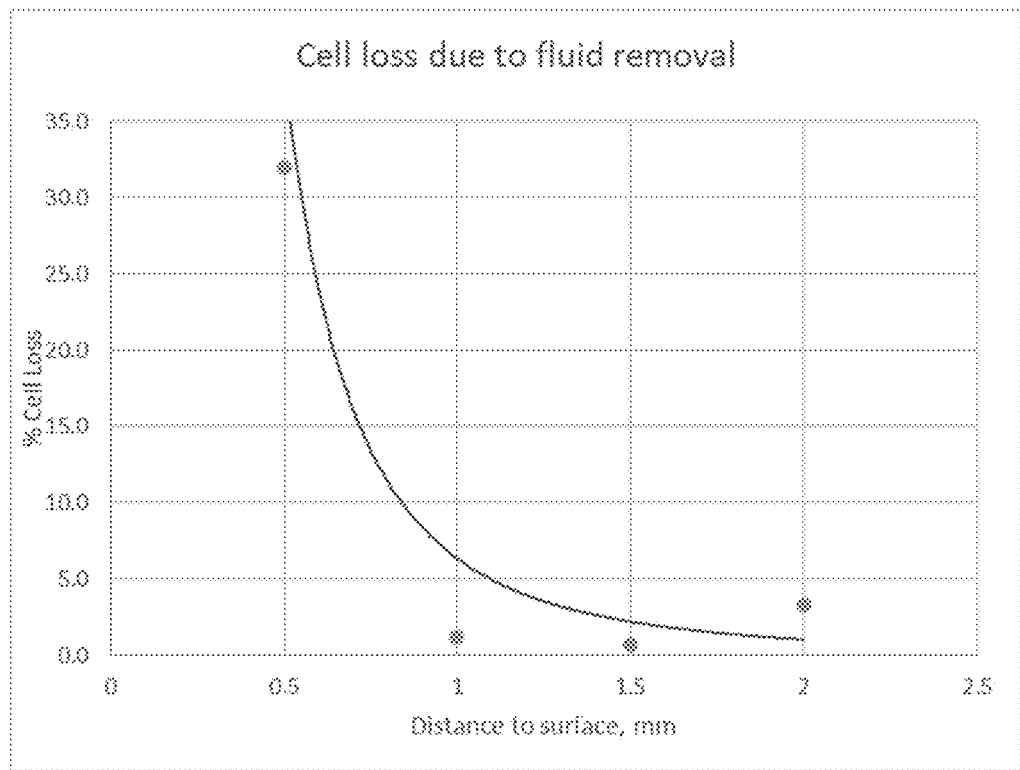
FIG. 21(a) shows percent cell loss as a function of the distance between the surface of the solid support 42 and the absorbing element 46, forming part of the present cell retention system, without addition of KCl.
Figure 21B:
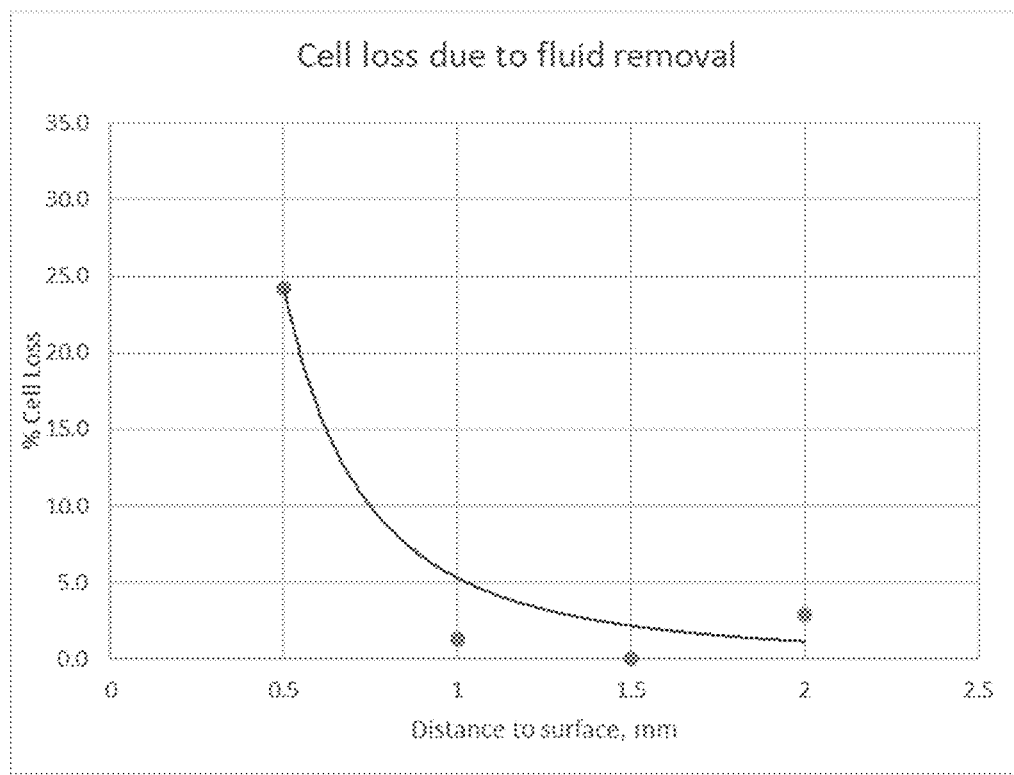
FIG. 21(b) shows percent cell loss as a function of the distance between the surface of the solid support 42 and the absorbing element 46, forming part of the present cell retention system and with KCl added to the solution.

FIG. 21 shows percent cell loss as a function of the distance between the surface of the solid support 42 and the absorbing element 46, forming part of the present cell retention system, without addition of KCl shown in panel (a) and with KCl added to the solution shown in panel (b).

Optimization of Wicking Height

Previous optimization of wicking rate was performed on live SK-BR-3 cells that were more adherent and robustly attached than other potential cell types. Working with a less "sticky" cell model: pre-fixed SK-BR-3 cells (ICTs) revealed that previous set height of 0.5 mm was resulting in cell loss during wicking. Therefore, extended distance between microscope slide and wicking tip in effort to decrease cell loss.

It was found that although no cell loss occurred at 1.0 mm wicking height, some changes in the positions of the cells indicated that the cells were still experiencing some form of turbulence, causing them to detach at 1.0 mm. Therefore, for the most gentle process the recommended value for the wicking height was found to be 1.5 mm or more. Wicking height of 2.0 mm opted for instead of 1.5 to provide greater buffer to minimize user to user variability when introducing wicking tip into supernatant.

Figure 22A:
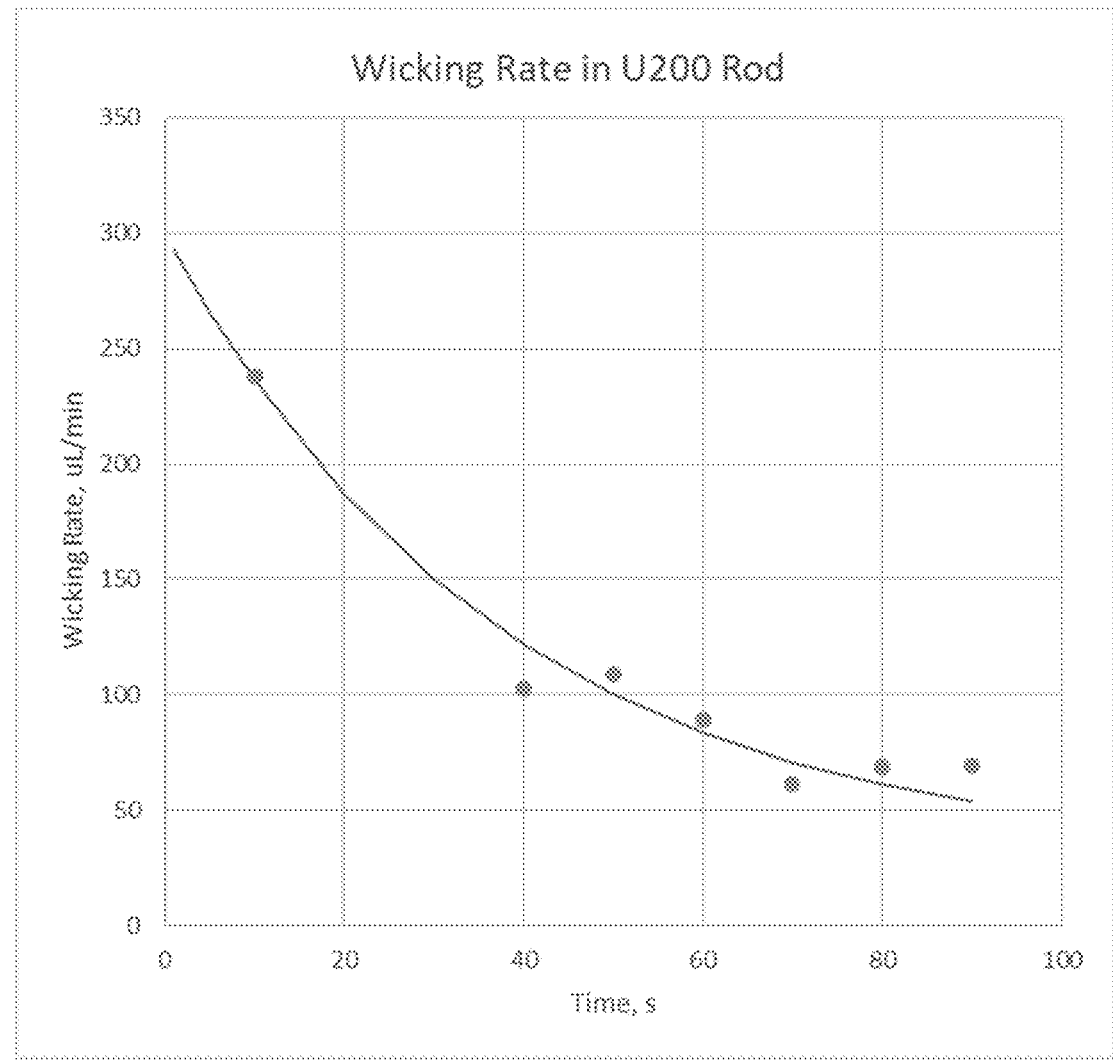
FIG. 22(a) shows the wicking rate as a function of time for polypropylene porous material U200 (Pore Technology Inc.), with the distance between the surface of the solid support 42 and the tip of the absorbing element 46 being about 2 mm.
Figure 22B:
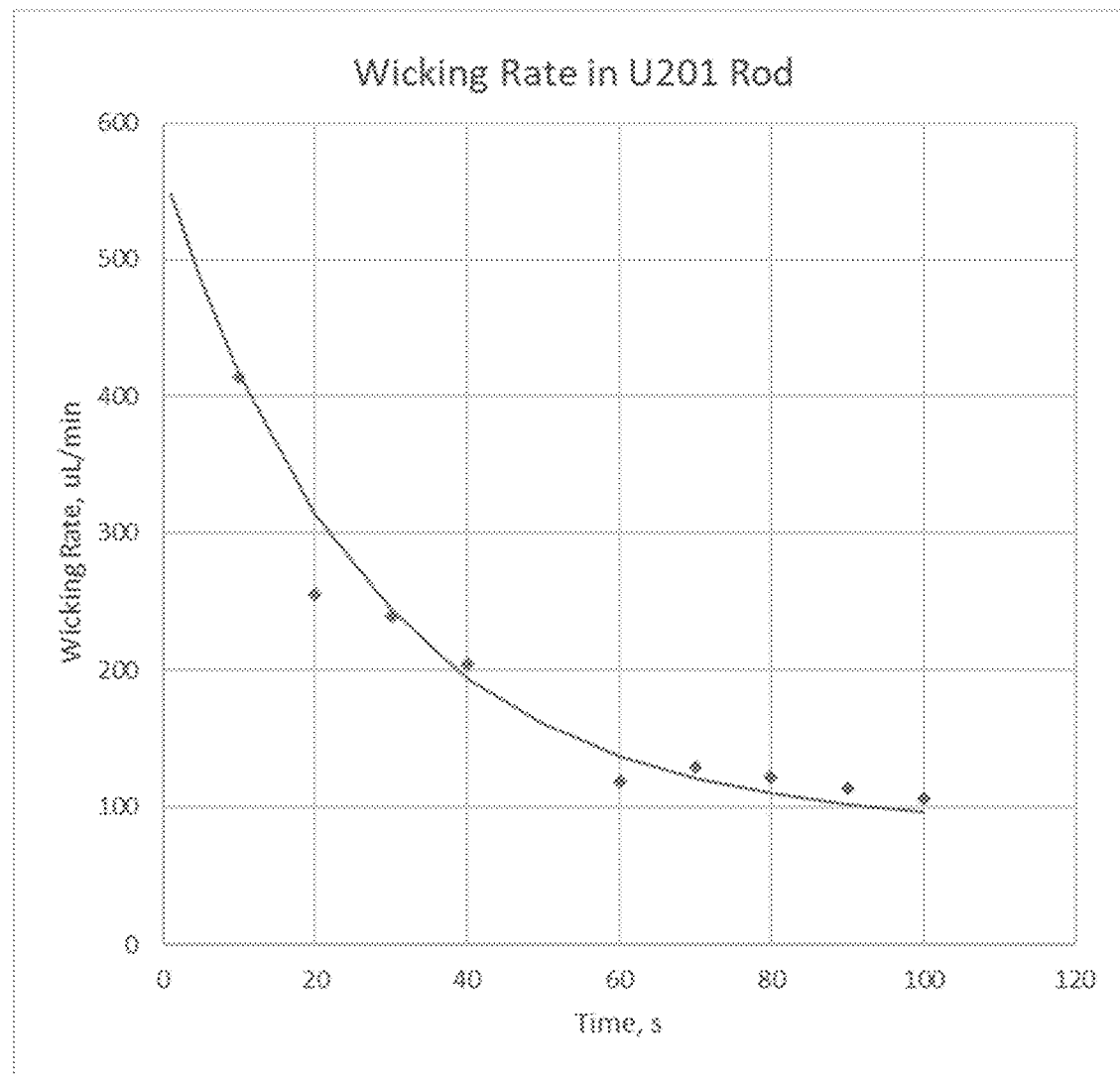
FIG. 22(b) shows the wicking rate as a function of time for polypropylene porous material U201 (Pore Technology Inc) with the distance between the surface of the solid support 42 and the tip of the absorbing element 46 being about 2 mm.

Optimization of the absorbing material and the distance between the surface of the slide and the tip of the absorbing material allows to select the required flow rate of the fluid, which should be below a threshold defined by shear stress on the cells which may cause detachment of the cells during fluid removal step. Flow rate for two different porous absorbing materials (U200 and U210, Pore Technology, Inc.) were measured for the distance of two mm. The results are shown in FIGS. 22(a) and 22(b). Specifically, FIGS. 22(a) and 22(b) show the wicking rate as a function of time for polyethylene porous materials U200 (Pore Technology Inc.) shown in panel 22(a) and U201 (Pore Technology Inc) shown in panel 22(b). The distance between the surface of the solid support 42 and the tip of the absorbing element 46 is about 2 mm.

The threshold level for cell detachment was determined experimentally and was equal to 500 uL/s for a selected geometry of the fluid chamber 44 and selected coating of the surface of the solid support 42 (a glass slide). Two mm distance between the solid support 42 and the tip of the absorbing element 46 is appropriate for the absorbing material U200 (see FIG. 22(a)) but this distance should be increased for the material U201 (see FIG. 22(b)).

Results (Pictures of Captured Cells, Evidence of the Decreased Cell Losses)

Pre-labelled SK-BR-3 cells processed through both systems and counted. n=10 replicates performed for both Cytospin®). and a cell recovery device. Non-parametric Wilcoxon rank sum test performed with a p value of 0.00018. A cell recovery device had an average of 94%±6% (SD) cell recovery rate.

Figure 23A:
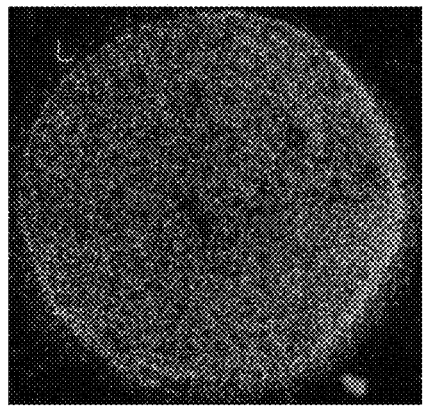
FIG. 23(a) is a microphotograph of DAPI stained cells spiked into fluid chamber 44 and sedimented by centrifugation and shows cells retained on the slide surface after centrifugation with consecutive fluid removal according to the present method.
Figure 23B:
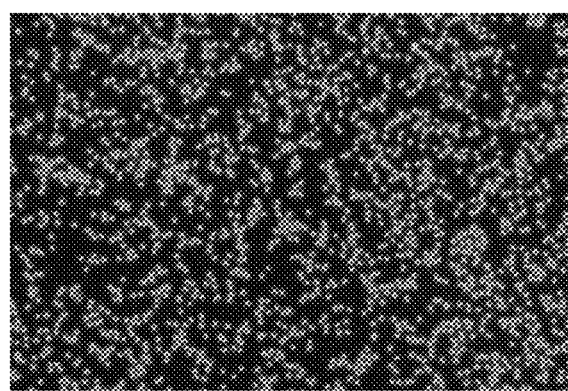
FIG. 23(b) is a magnified image (×100) of the microphotograph of FIG. 23(a).

FIG. 23(a) is a microphotograph of DAPI stained cells spiked into fluid chamber 44 and sedimented by centrifugation using device according to the present method which shows cells retained on the slide surface after centrifugation with consecutive fluid removal. FIG. 23(b) is a magnified image (×100) of the microphotograph of FIG. 23(a). FIGS. 23(a) and 23(b) demonstrate improvement of the retention (capture) rate in the proposed method and device compared with the standard in industry Cytospin® method. The improved morphology shows less severe "flattening" of cells and less blebbing, reduced signal intensity of cells on Cytospin® compared to a cell recovery device. Cytoplasmic spreading not seen with a cell recovery device. Staining intensity in a cell recovery device is much higher.

Figure 24:
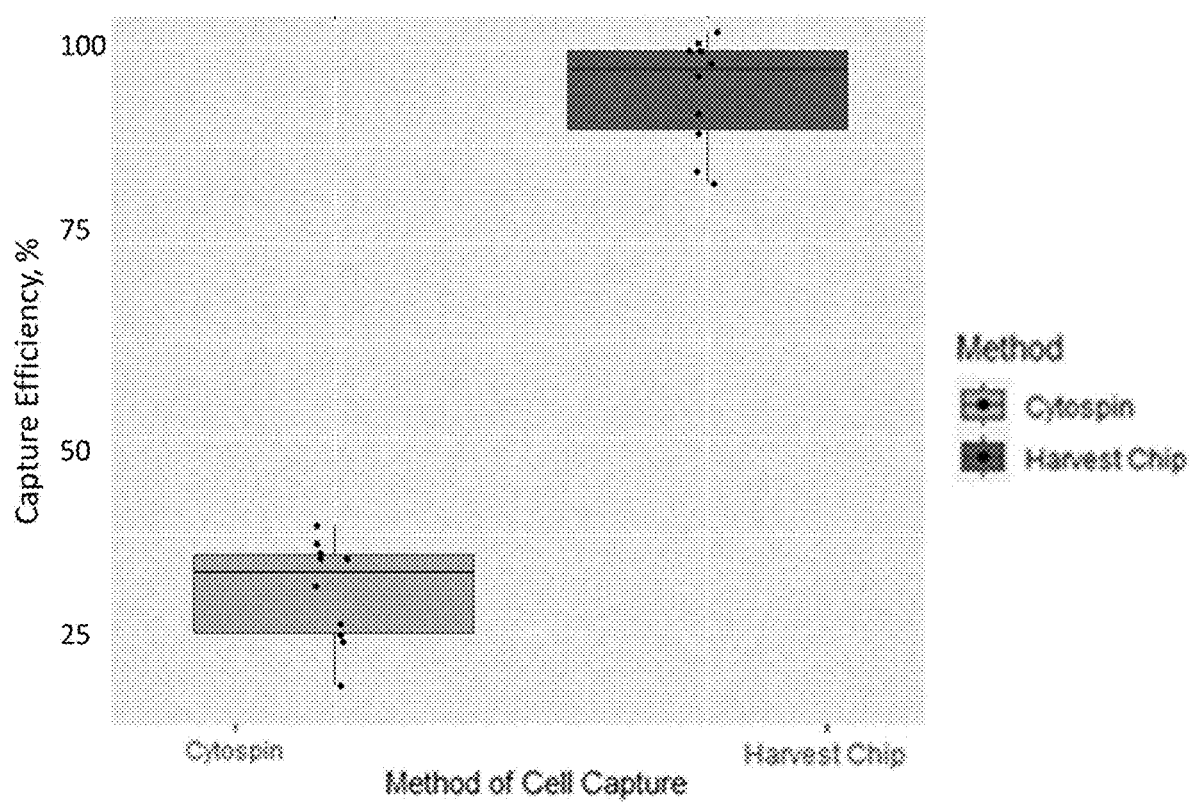
FIG. 24 shows percent cell capture efficiency for two methods of cell capture: in Cytospin® shown in data set 1 and using the present cell retention method and device shown in data set 2.

FIG. 24 shows percent cell capture efficiency for two methods of cell capture: in Cytospin® shown in data set 1 and using the present cell retention method and device shown in data set 2. It is clear from FIG. 24 that controlled fluid removal rate in combination with other features of the proposed method allows for an increase of the capture rate of cells from approximately 30% (Cytospin® data set in FIG. 24) to over 90-95% in the proposed device (Harvest Chip data set in FIG. 24).

Figure 25A:
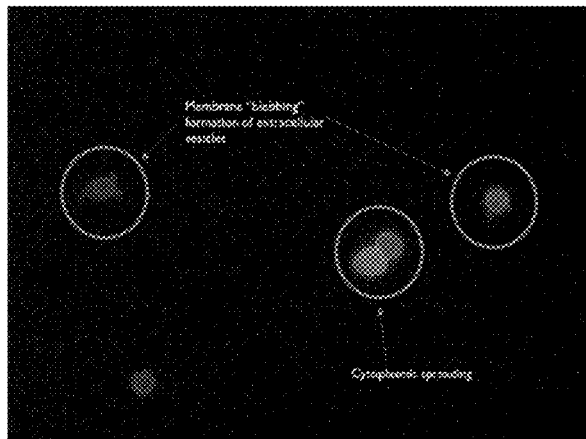
FIG. 25(a) shows microphotographs of cells captured using Cytospin®.
Figure 25:
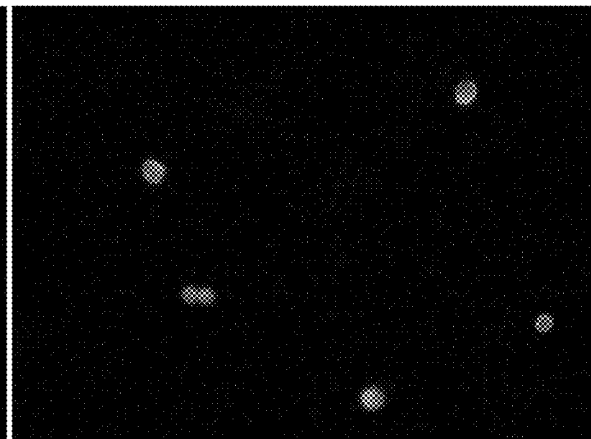
FIG. 25(b) shows microphotographs of cells captured using the cell recovery device 40 of the present cell retention device, which clearly shows the present method preserves the morphology of the harvested cells.

FIG. 25(a) shows microphotographs of cells captured using Cytospin® and FIG. 25(b) shows microphotographs of cells captured using the cell recovery device of the present cell retention device. The cells captured using Cytospin® can be seen to be damaged while FIG. 25(b) clearly shows the present method preserves the morphology of the harvested cells.

Figure 26A:
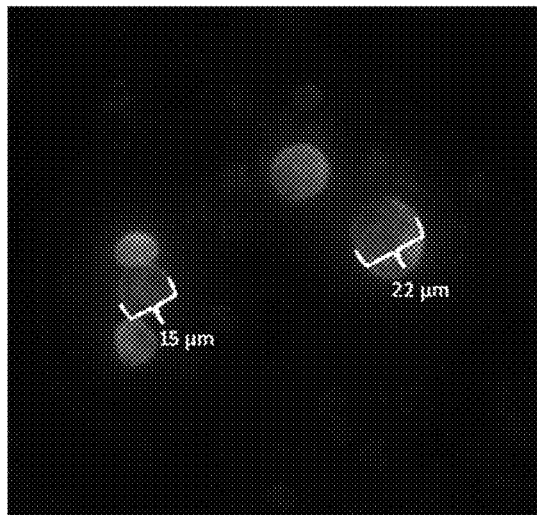
FIG. 26(a) shows microphotographs showing the morphology of SK-BR-3 cells which were fixed with lack of fluid around them (referred to as dry fix), with the images being obtained using 400× magnification and CK-FITC conjugate stain.
Figure 26B:
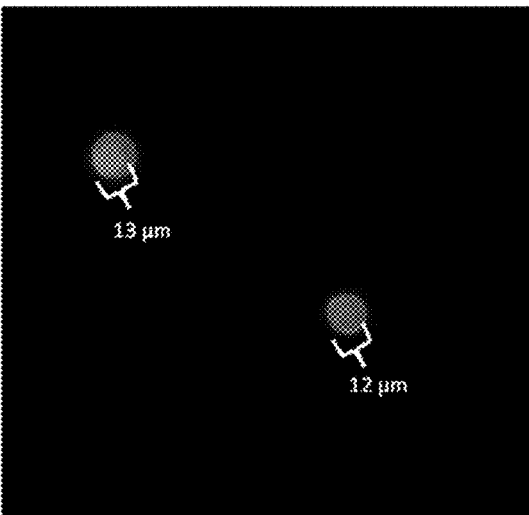
FIG. 26(b) shows microphotographs showing the morphology of SK-BR-3 cells which were fixed in the presence of controlled volume of fluid (wet fix), with the images being obtained using 400× magnification and CK-FITC conjugate stain.

FIG. 26(a) shows a microphotograph showing the morphology of SK-BR-3 cells which were fixed with lack of fluid around them (referred to as dry fix), while FIG. 26(b) shows a microphotograph showing the morphology of SK-BR-3 cells which were fixed in the presence of controlled volume of fluid (referred to as wet fix). The images being obtained using 400× magnification and CK-FITC conjugate stain. As can be seen in FIGS. 26(a) and 26(b), control of the residual volume of fluid which is present in the device after the bulk amount of fluid is removed allows for improvement of the retained cell morphology. An additional advantage of controlled volume present in the device at the stage of staining is that the background level is reduced in this case. Fixation with controlled volume of residual fluid produced the lowest background signal compared to Cytospin® or dry fix approach when there is no fluid present (FIG. 26(b)) or no control of the residual fluid level (FIG. 26(a)).

It was demonstrated larger overall cell size 15~25 μm diameter is observed in Cytospin® compared to 12~20 μm on the solid support of the cell recovery device (dry fix) and 12~15 μm (wet fix). Also, images obtained with the slides processed using Cytospin® had lower fluorescence signal. Signals with a cell recovery device with controlled volume of residual fluid (Wet fix) exhibited the strongest intensity and dry fix was in-between the Cytospin® and wet fix.

Figures 27A, 27B:
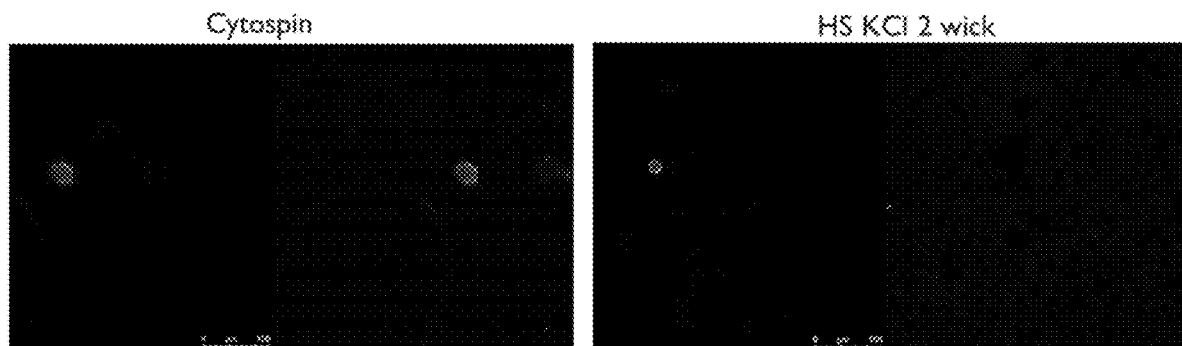
FIG. 27(a) shows a microphotograph of the circulating tumor cells (CT) retained with Cytospin® using Streck Biomedica mBC patient samples.
FIG. 27(b) shows a microphotograph of the circulating tumor cells (CT) retained with the present cell retention device using Streck Biomedica mBC patient samples, which shows the morphology of the sedimented cells is noticeably better when the method disclosed herein is used.

Similar results are obtained with the patient samples processed using Cytospin® and the present cell capture device, see FIGS. 27(a) and 27(b). Comparison between Cytospin® and the present device on final morphology: cells retained using Cytospin® in FIG. 27(a) appear much larger and more jagged compared to the cells retained using the present device shown in FIG. 27(b).

Figure 28:
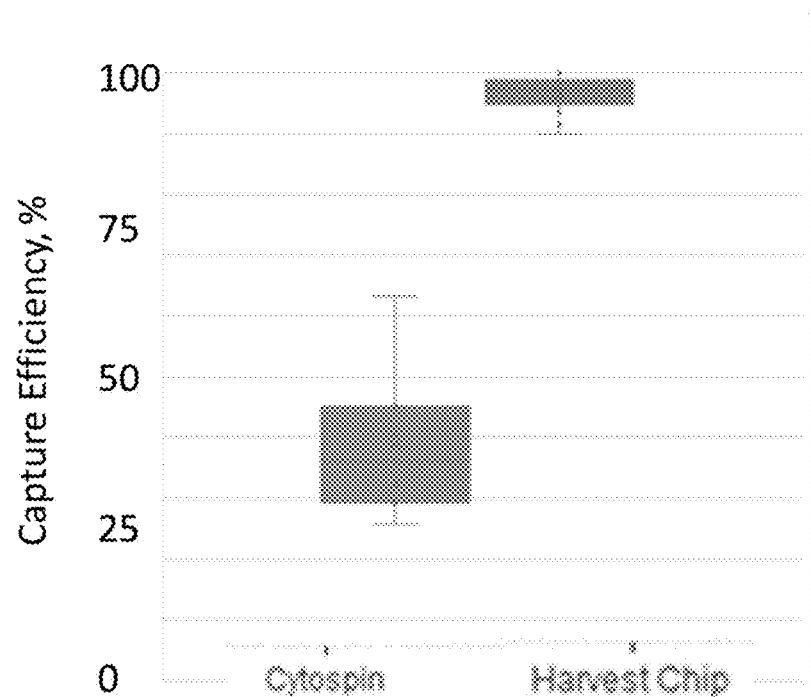
FIG. 28 shows a histogram of the capture efficiency of EDTA HNV blood spiked with pre-labelled SK-BR-3 cells separated via Parsortix®, pooled, captured, fixed and then stained on either a cell recovery device 40 of the present cell retention device or Cytoslide™. The experiments were performed by multiple trained users across multiple instruments/days. Impact of the pipetting variability is reduced (compare STD on Cytospin® and a cell recovery device 40).

EDTA HNV blood spiked with pre-labelled SK-BR-3 cells separated via Parsortix®, pooled, captured, fixed and then stained on either solid support of the cell recovery device or Cytoslide™ (Fisher Scientific). (Experiments performed by multiple trained users across multiple instruments/days). Impact of the pipetting variability is reduced (compare STD on Cytospin® and HS). The results are shown in FIG. 28 The summary statistics: Cytospin®: 38.8%±12.6%, a cell recovery device fix: 96.7%±3.3%. As can be seen, significantly better final capture efficiency (counting after staining) on the present a cell recovery device compared to Cytospin®. Most of the cell loss seen in Cytospin® occurred during initial spin down of cells onto slide using the filtercard fluid chamber 44.

Post Processing of Cells

Figure 29:
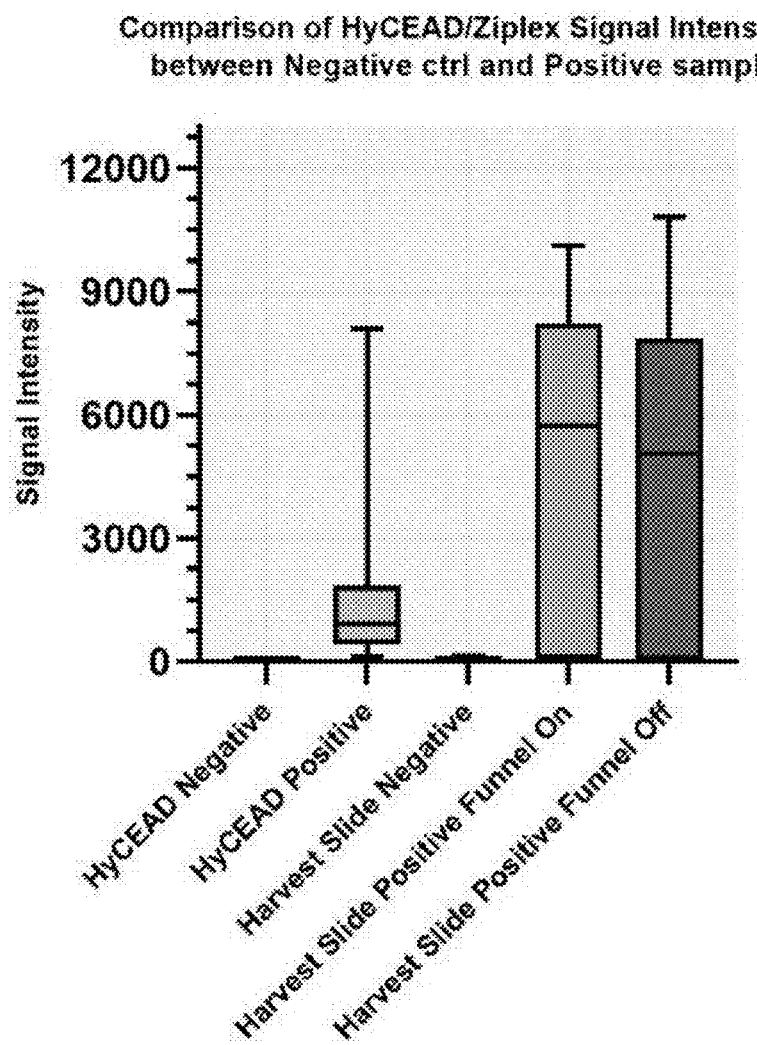
FIG. 29 show histograms plotting HyCEAD™/Ziplex® signal intensities for the negative control and positive control for the HyCEAD™ process used for the consecutive molecular analysis of retained cells, negative control for the complete process of sample retention and consecutive molecular analysis and two modes of cell retention with the cell containing samples with consecutive molecular analysis.

Example of cells post-processing: Lysis of the retained cells with a consecutive molecular analysis is shown in FIG. 29, which shows a histogram of the capture efficiency of EDTA HNV blood spiked with pre-labelled SK-BR-3 cells separated via Parsortix®, pooled, captured, fixed and then stained on either a cell recovery device of the present cell retention device or Cytoslide™. The experiments were performed by multiple trained users across multiple instruments/days. Impact of the pipetting variability is reduced (compare standard deviation (STD) on Cytospin® and cell recovery device 40).

Figure 30:
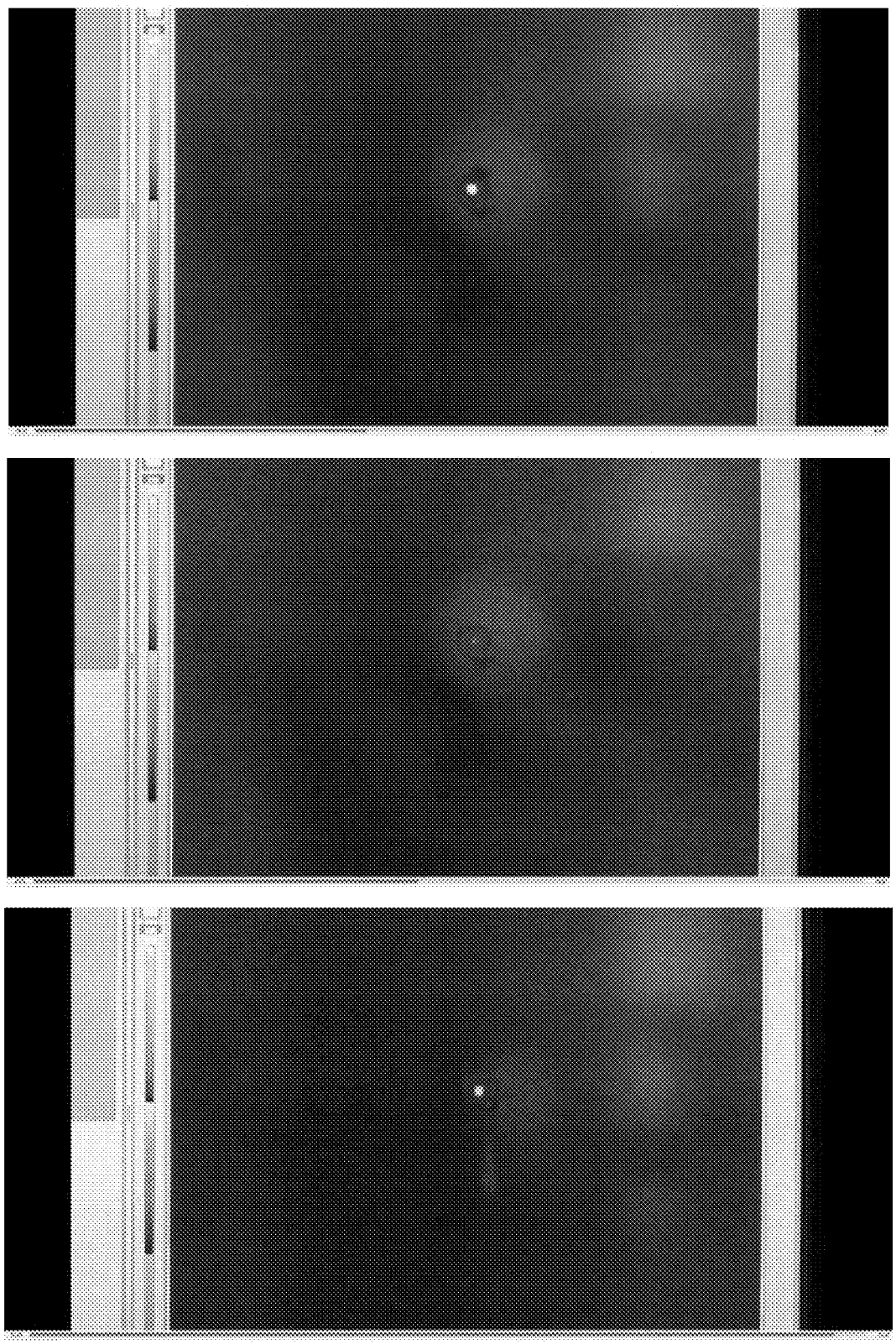
FIG. 30 shows picking of SK-BR-3 cells deposited onto the solid support 42 with a controlled volume of the residual fluid according to a proposed method. The top panel shows a retained cell with a capillary of a cell-picking tool placed above this cell; the middle panel shows the cell being removed from its initial location by the cell-picking tool, and the bottom panel shows the cell dispensed (re-positioned) by the cell-picking tool.

Prelabelled SK-BR-3 cell can be seen inside capillary micropipette (image 1) on the surface of the solid support 42 of a cell recovery device followed by suction into microcapillary (image 2) which is subsequently moved to a different location on the slide surface and deposited (image 3). Single cell picking results with the present cell recovery device are shown in FIG. 30 which shows picking of SK-BR-3 cells deposited onto the solid support with a controlled volume of the residual fluid according to a proposed method. Prelabelled SK-BR-3 cell can be seen inside capillary micropipette (upper panel of FIG. 30) on the surface of the solid support 42 of a cell recovery device followed by suction into microcapillary (middle panel of FIG. 30) which is subsequently moved to a different location on the slide surface and deposited (bottom panel of FIG. 30).

Figure 31:
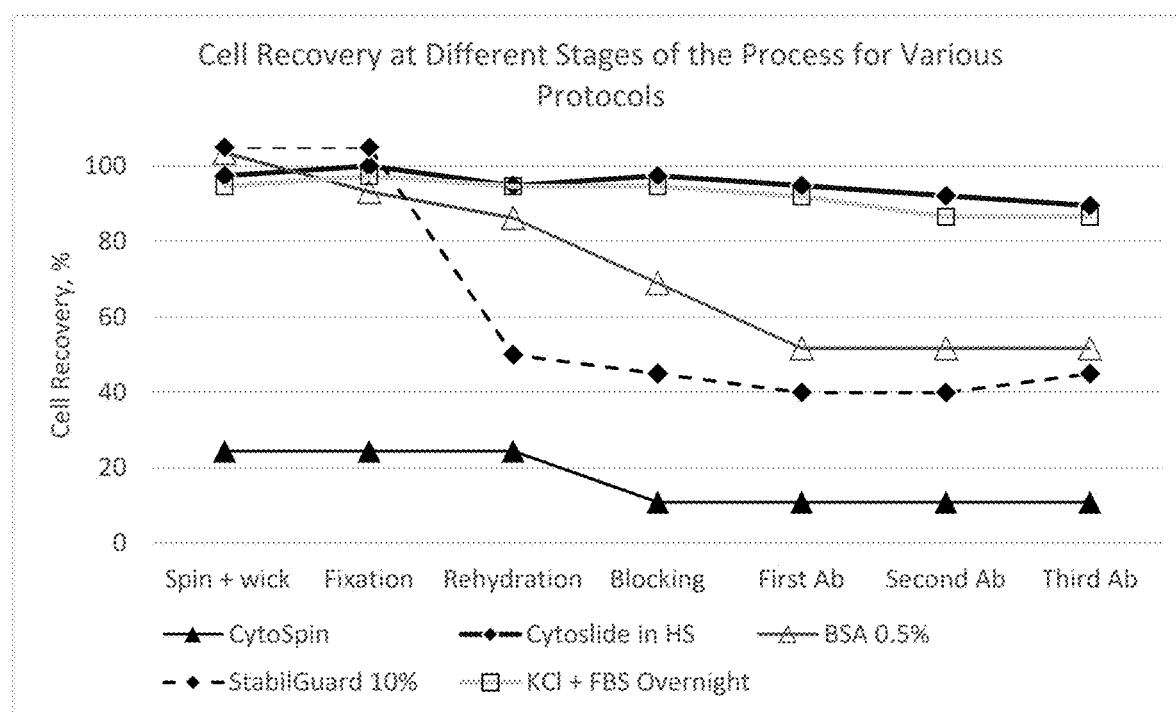
FIG. 31 shows % cell recovery at different stages of the process with various protocols as noted in FIG. 31.

FIG. 31 Illustrates that if the parameters are not properly controlled, the cell losses may be high, where FIG. 31 shows picking of SK-BR-3 cells deposited onto the solid support 42 with a controlled volume of the residual fluid according to a proposed method. The top panel shows a retained cell with a capillary of a cell-picking tool placed above this cell; the middle panel shows the cell being removed from its initial location by the cell-picking tool, and the bottom panel shows the cell dispensed (re-positioned) by the cell-picking tool. The amount of cell loss due to wicking and resuspension steps is minimal when using the cell recovery device apparatus with 2.0 mm wicking height and two-piece wicking cap.

With proper control of the process parameters (wicking rate and volume of residual fluid the cell loss is insignificant even with multiple steps of the process. This is also confirmed by FIG. 32 which shows % cell recovery at different stages of the process with various protocols as noted in the FIG. 32. Staining of cells directly in the cell recovery device fluid chamber 44 as a post processing step is possible. This would require multiple wicking steps for exchanging reagents within the fluid chamber however this replaces the multiple steps in post slide fixation staining. As can be seen from FIG. 32 cell loss due to wicking of supernatant and exchange of fluids has been demonstrated to be minimal.

Figure 32:
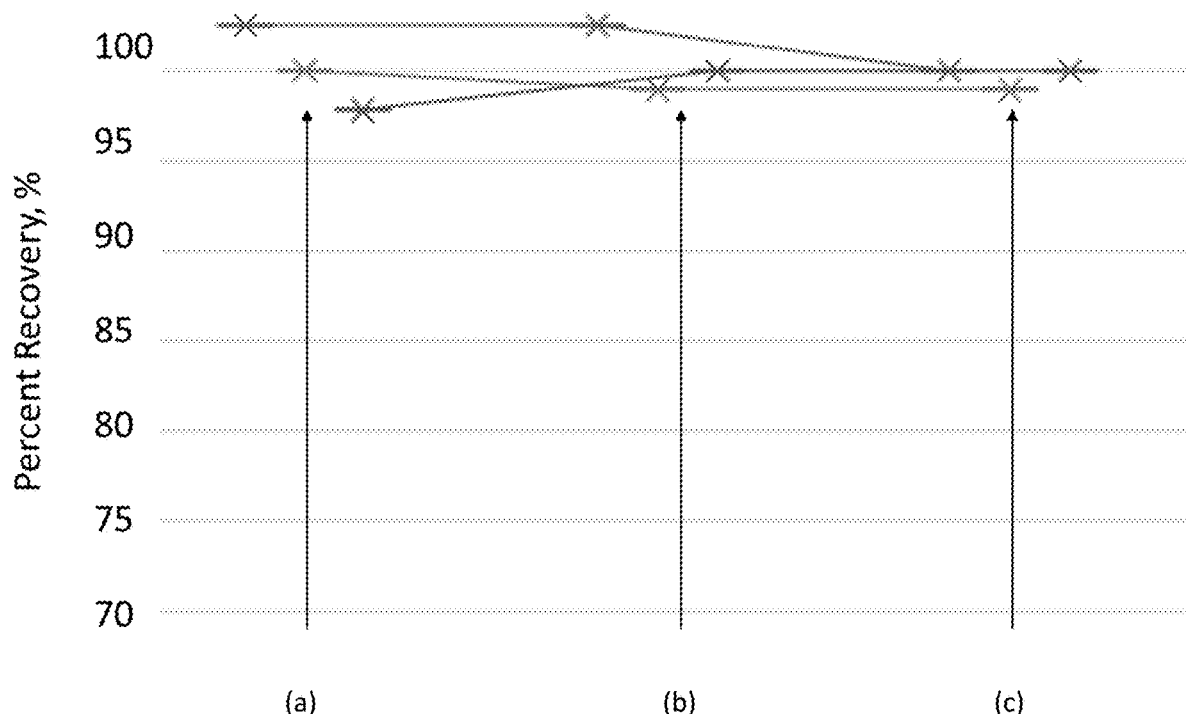
FIG. 32 shows percent of cell recovery for multiple consecutive wicking steps (a, b, c) in which the first wicking (a) is done after cell sedimentation, the second wicking (b) is done after resuspension and the third wicking (c) is done after staining, and wherein the test was repeated three times demonstrating that multiple wicking events do not lead to cell losses if the wicking rate is properly selected according to the present method.

The attainment of good morphology and high recovery is shown in FIG. 32 which shows percent of cell recovery for multiple consecutive wicking steps (a, b, c) in which the first wicking (a) is done after cell sedimentation, the second wicking (b) is done after resuspension and the third wicking (c) is done after staining, and wherein the test was repeated three times demonstrating that multiple wicking events do not lead to cell losses if the wicking rate is properly selected according to the present method.

Figure 34:
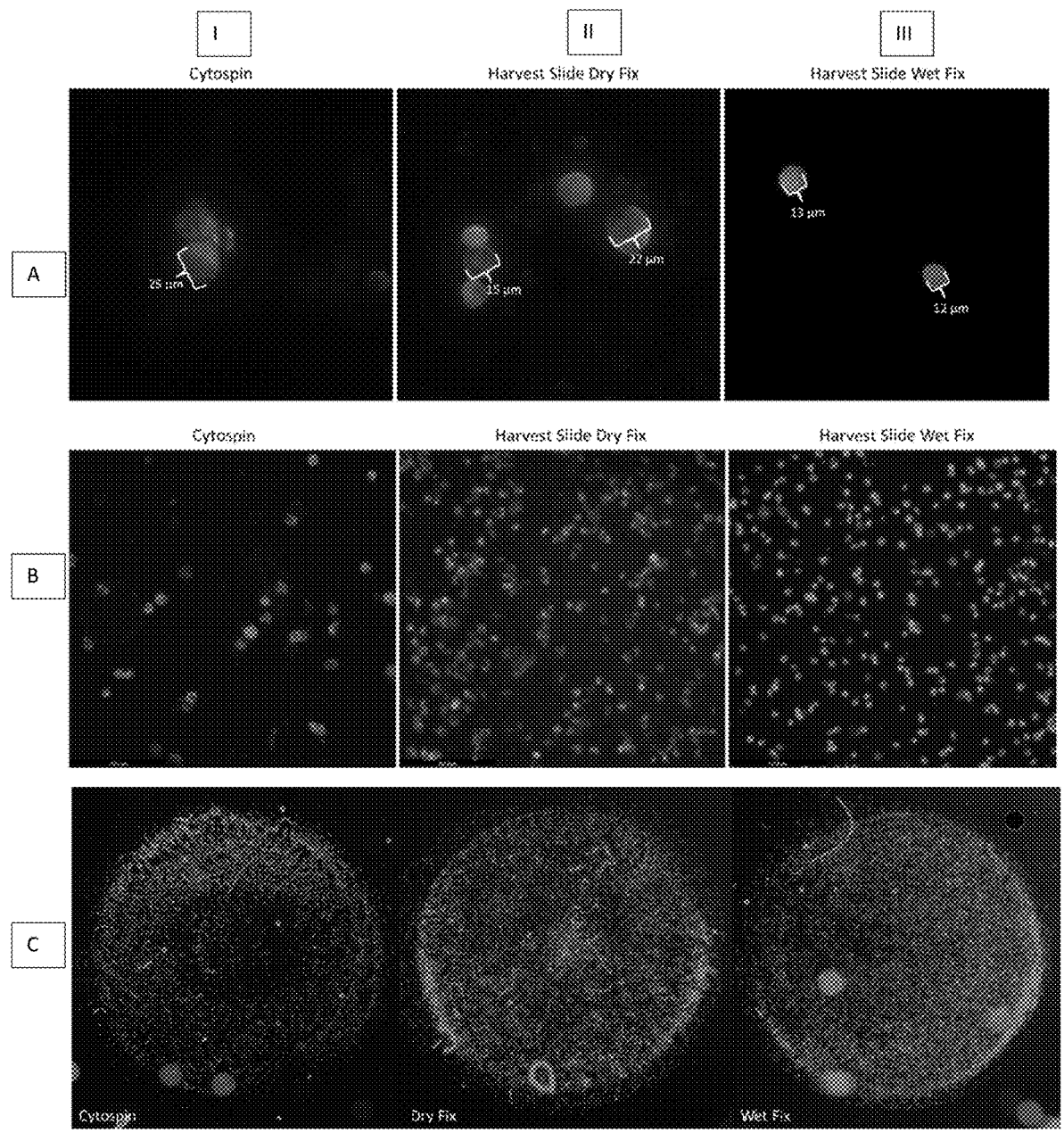
FIG. 34 shows microphotographs (rows A, B) and a photograph (row C) for the cells sedimented using Cytospin® (column I) on the solid support of a cell recovery device forming part of the present cell harvesting device (columns I and II) without controlling residual fluid (column II) and with control of residual fluid volume (column Ill) according to the method disclosed herein. The cell recovery device spiked HNV cell data—a cell recovery device with wet fixation method on live EDTA tube cells after staining. Cytospin® presented the worst morphology (column I, rows A and B) with cytoplasmic spreading and reduced fluorescence intensity as well as increased background. Least amount of morphological alteration was seen in wet fixed a cell recovery device 40 condition (column Ill). Similar results seen concerning CD45 staining showing reduced cell density in Cytospin® is also of concern.

Data with Streck SKBR-3 samples counted between each wicking and buffer exchange step shown in FIG. 32 and the image of the surface with the retained cells stained in the proposed device is shown in FIG. 34.

Figure 33:
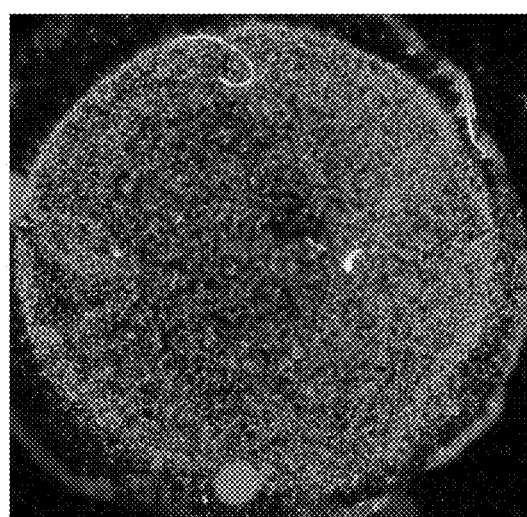
FIG. 33 is a microphotograph of white blood cells sedimented using the present method disclosed herein and stained with DAPI in which the photograph is taken with the fluid chamber 44 still attached to the solid support demonstrating that the cells can be stained with the fluid chamber 44 attached.

In-fluid chamber 44 staining of cells with DAPI is shown in FIG. 33 which is a microphotograph of white blood cells sedimented using the present method disclosed herein and stained with DAPI in which the photograph is taken with the fluid chamber 44 still attached to the solid support demonstrating that the cells can be stained with the fluid chamber 44 attached.

FIG. 34 shows microphotographs (rows A, B) and a photograph (row C) for the cells sedimented using Cytospin® (column I) and on the solid support 44 of the cell recovery device 40 forming part of the present cell harvesting device (columns I and II) without controlling residual fluid (column II) and with control of residual fluid volume (column III) according to the method disclosed herein. The HNV cells were spiked into a fluid sample placed in the cell recovery device 40 with the following wet fixation method on live EDTA tube cells after staining. The same sample was used for cell sedimentation using Cytospin®. Cytospin® presented the worst morphology (column I, rows A and B) with cytoplasmic spreading and reduced fluorescence intensity as well as increased background. Least amount of morphological alteration was seen in wet fixed a cell recovery device 40 condition (column III). Similar results seen concerning CD45 staining showing reduced cell density in Cytospin® is also of concern.

The following non-limiting and exemplary of protocols for use of device.

Cell Recovery Device 40 EDTA Protocol (On-Slide Staining)
1. Directly deposit the contents of the Parsortix® harvest into the cell recovery device 40 fluid chamber 44.
2. Spin down the sample in the StatSpin™ CytoFuge™ (This is a reference to this device https://www.fisher-sci.ca/shop/products/statspin-cytofuge-2-personal-cytocentrifuge-system-3/220011)(for 2 min at 600 rpm followed by a 2 min spin at 4400 rpm.
3. Screw on the Wicking Cap 50 and allow the device to wick for 5 min.
4. Pipette in 150 μL of ice-cold acetone into the fluid chamber 44 against the tube wall and incubate for 5 min in a freezer (−20° C.) to fix the cells.
5. After fixation, decant the remaining acetone into the appropriate waste container.
6. Detach the fluid chamber 44 from the cell recovery device 40.
7. Allow any residual acetone to evaporate off and leave a dry slide (10 min) before moving forward to staining or storage.

Cell Recovery Device Streck Protocol (On-Slide Staining)
1. Directly deposit the contents of the Parsortix® harvest into the cell recovery device 40 fluid chamber 44.
2. Spin down the sample in the StatSpin™ CytoFuge™ for 2 min at 600 rpm followed by a 2 min spin at 4400 rpm.

3. Screw on the Wicking Cap and allow the device to wick for 5 min.
4. Prepare a drying buffer consisting of 200 μL solution of 10% Serum (Horse or Fetal Bovine) in 0.083M KCl (i.e., 20 μL Serum+180 μL KCl solution).
5. Pipette in the 200 μL of drying buffer into the fluid chamber 44 against the tube wall.
6. Spin down the sample in the StatSpin™ CytoFuge™ for 2 min at 600 rpm.
7. Use a second Wicking Cap 50 to wick off the supernatant.
8. Detach the fluid chamber 44 from the cell recovery device 40.
9. Disassemble the cell recovery device—pull the PTFE slide out of the Base.
10. Place the PTFE slide with sample onto a hot-plate set to 37° C. and allow the liquid remaining on the target area to evaporate for 30 minutes.
11. After confirming that the slide surface has fully dried, proceed to fixation.
12. Using a pipette, introduce 50 μL of ice-cold acetone onto the target area on the slide in a dropwise fashion.
13. Place the Slide in a freezer (−20° C.) for 5 min to fix cells.
14. Decant any residual acetone and allow Slide to dry (10 min) before moving forward to staining or storage.

Cell Recovery Device 40 Streck Protocol (in-Solution Staining)
1. Directly deposit the contents of the Parsortix® harvest into the cell recovery device 40 fluid chamber 44.
2. Spin down the sample in the StatSpin™ CytoFuge™ for 2 min at 4400 rpm.
3. Screw on the Wicking Cap 50 containing the absorbing element 46 and allow the device to wick for 5 min.
4. Prepare x μL of staining solution (20~50 μL solutions have been tested previously) in permeabilization reagent (e.g., Inside Perm). Preferably, all antibodies will be fluorophore conjugated, thus allowing for a single antibody incubation rather than multiple.
5. Introduce the 50 μL of staining solution into the cell recovery device 40 fluid chamber 44 by pipetting against the wall of the device.
6. Incubate the solution for 45 min at room temperature in the dark.
7. After antibody incubation, gently introduce 200 μL of 1×PBS into the fluid chamber 44 pipetting against the wall.
8. Spin down the sample in the StatSpin™ CytoFuge™ for 2 min at 4400 rpm.
9. Screw on the Wicking Cap 50 containing the absorbing element 46 and allow the device to wick for 5 min.
10. Repeat the procedure of adding 1×PBS and wicking 2 times to fully wash out any remaining debris.
11. For the final wash prior to cover-slipping, formulate a 200 μL 5% Glycerol solution in Deionized Water.
12. After wicking, use a P1000 pipette to introduce the 5% Glycerol solution into the fluid chamber 44. Gently mix the solution within the fluid chamber 44 to resuspend the cells in order to ensure an even distribution.
13. Spin the sample down in the StatSpin™ CytoFuge™ for 2 min at 600 rpm followed by a 2 min spin at 4400 rpm.
14. Screw on the Wicking Cap 50 containing the absorbing element 46 and allow the device to wick for 5 min.
15. Detach the fluid chamber 44 using the Detacher Tool and remove the PTFE Slide containing the sample from the Base.
16. Place the PTFE Slide onto a hot-plate set to 37° C. and incubate for 30 minutes. Protect the slides from light to prevent photobleaching.
17. After drying, any remaining glycerol on the target area of the PTFE Slide will still look glassy.
18. Add 1 droplet of mounting media onto the target area and place a coverslip on top. Apply pressure from one edge of the coverslip to prevent air bubbles.

Cell Recovery Device 40 Protocol—Alternative Proteinaceous Buffers
1. FBS is labour intensive to prepare (heat inactivate) and difficult to ship.
2. Alternatives (Stabilguard, BSA, Horse Serum, Hank's) explored for equivalent performance to FBS.
3. 10% Horse Serum (same reagent used in blocking step) performed just as well as FBS. Also circumvents need for blocking prior to staining.

Optimization of Fluid Removal Rate by Selection of the Absorbing Material, the Distance Between the Slide and the Tip of the Absorbing Element and Cross-Section of the Absorbing Element.

It was found that porous material by itself absent housing 48 gave an absorption rate that was too fast leading to cell detachment hence using the absorbing element housing 48 was found to be very beneficial in order to limit contact area between liquid medium and porous material. In an embodiment housing 48 can be made of polypropylene. However, it will be appreciated that housing 48 could be made from other materials, including but not limited to polycarbonate, polystyrene, other types of plastic, rubber, glass or metal.

Experiments were conducted using live pre-labelled SK-BR-3 as a model system. These cells were sedimented on the surface of the solid support 42 and then the fluid was removed using a syringe pump with different withdrawal rates. Cell loss was evaluated at each removal rate. As a result, cell loss associated with increasing rates of liquid removal was determined. Tests were conducted on cells sedimented at two different centrifugal forces (265×g/2200 rpm and 1060×g/4400 rpm) to determine maximum allowable fluid removal rate for cells more loosely and strongly adhered to slide surface.

It was determined that for both cells adhered at low centrifugal force (265×g) and high centrifugal force (1060× g), the maximum allowable rate of supernatant withdrawal was 500 μL/min. Cell dissociation from slide surface was observed more drastically at rates higher than 500 μL/min for cells sedimented at 265×g compared to those sedimented at 1060×g. To minimize the chances of losing cells during the wicking process, the lower sedimentation force (265×g) condition was used to determine the maximum allowable wicking rate.

Therefore what is claimed is:
1. A method of harvesting target cells from a fluid sample, comprising:
   a) placing a fluid sample into a fluid chamber that is configured to be releasably held in a centrifuge, the fluid chamber being in flow communication with a surface of a solid support, with a seal-tight connection between the fluid chamber and the solid support, sealing the fluid chamber with a first cap, said solid support being detachable from said fluid chamber;
   b) releasably attaching the fluid chamber with solid support attached thereto to a centrifuge and centrifuging the fluid sample to induce sedimentation of the target cells and promote cell adhesion to the surface of the solid support;
   c) removing the device from the centrifuge;

d) removing the first cap and inserting a fluid absorbing element such that a tip of the fluid absorbing element is spaced from the surface of the solid support at a predefined distance, sealing said fluid chamber with a second cap configured to be compatible with said fluid absorbing element;

e) said fluid absorbing element having a cross-sectional area, a distribution along the axis of said fluid absorbing element and a porosity in a range to provide a controlled flow rate of the fluid out of the fluid chamber and the tip of said fluid absorbing element being located at the predefined distance from the surface of the solid support such that the target cells settled on the solid support are not detached from the surface of the solid support by the flow rate of the fluid being absorbed by the fluid absorbing element; and f) controlling the remaining volume of fluid to avoid removal of fluid below the predefined volume so that the target cells remain in some fluid so that the target cell morphology is not affected by centrifugation under dry conditions.

2. The method according to claim 1, wherein the controlled flow rate is controlled by the porosity of the material the absorbing element is made of, an area of the opening in the enclosure of the absorbing element and cross-section of the absorbing element.

3. The method according to claim 1, wherein an area on said surface of said solid support onto which the target cells sediment is of a selected size defined by an opening in said fluid chamber through which the target cells flow during sedimentation, and wherein said surface with the area of selected size is functionalized with agents selected to modify the interaction between the targeted cells and the surface to assist adherence of the targeted cells to said top surface of said solid support.

4. The method according to claim 3, wherein said agents are selected from the group consisting of poly-L-lysine, silane coatings, gelatin, fibronectin, gold or silver coatings.

5. The method according to claim 3, wherein said agents are selected to provide a differential binding force to the targeted cells and any other cells such that the targeted cells are bound to the surface while other cells do not bind the surface of said top surface of said solid support.

6. The method according to claim 5, wherein the parameters of the absorbing element and the absorbing element housing are selected so that the shear force associated with the fluid removal rate is low enough so that the detachment of the target cells does not occur, but the same shear force is sufficient for removal of the other cells leading to enrichment of target cells.

7. The method according to claim 1, further comprising post-processing of the target cells adhered to the surface of the solid substrate by the steps of consecutive introduction and removal of fluid reagents into the fluid chamber so that at each step the flow rate is controlled so that the sedimented cells are not detached and lost and the remaining volume of fluid at each consecutive step is controlled to avoid removal of fluid below the predefined volume so that the target cell morphology is not affected by centrifugation in dry conditions.

* * * * *